United States Patent
Hashiura et al.

(10) Patent No.: US 10,644,896 B2
(45) Date of Patent: May 5, 2020

(54) CONTROL DEVICE, STORAGE MEDIUM, CONTROL METHOD FOR CONTROL DEVICE, CONTROL SYSTEM, TERMINAL DEVICE, AND CONTROLLED DEVICE

(71) Applicant: Sharp Kabushiki Kaisha, Sakai, Osaka (JP)

(72) Inventors: Masaki Hashiura, Sakai (JP); Kazunori Yasuda, Sakai (JP); Yoshie Komatsu, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 226 days.

(21) Appl. No.: 15/544,229

(22) PCT Filed: Dec. 18, 2015

(86) PCT No.: PCT/JP2015/085543
§ 371 (c)(1),
(2) Date: Jul. 17, 2017

(87) PCT Pub. No.: WO2016/117261
PCT Pub. Date: Feb. 28, 2016

(65) Prior Publication Data
US 2017/0353326 A1 Dec. 7, 2017

(30) Foreign Application Priority Data
Jan. 19, 2015 (JP) .................................. 2015-008153

(51) Int. Cl.
*H04L 12/28* (2006.01)
*H04M 11/00* (2006.01)
(Continued)

(52) U.S. Cl.
CPC ........ *H04L 12/2818* (2013.01); *G05B 13/024* (2013.01); *G05B 15/02* (2013.01);
(Continued)

(58) Field of Classification Search
CPC ............ H04L 12/2812; H04L 12/2825; H04L 12/2829; H04L 2012/285;
(Continued)

(56) References Cited

U.S. PATENT DOCUMENTS 5,717,744 A 2/1998 Yoshida et al.
6,990,335 B1* 1/2006 Shamoon ............... G01D 21/00
455/419
(Continued)

FOREIGN PATENT DOCUMENTS

CN 103716225 A 4/2014
CN 104007741 A 8/2014
(Continued)

*Primary Examiner* — Thomas C Lee
*Assistant Examiner* — Anzuman Sharmin
(74) *Attorney, Agent, or Firm* — ScienBiziP, P.C.

(57) ABSTRACT

In the present invention, a household appliance is controlled in accordance with a state of a user. An agent server (1) in accordance with the present invention includes a setting management section (21) which identifies a mode corresponding to a state of the user and a process executing section (22) which executes a process in accordance with the mode identified by the setting management section (21).

16 Claims, 20 Drawing Sheets

(51) Int. Cl.
*G06F 13/00* (2006.01)
*H04Q 9/00* (2006.01)
*G08C 17/02* (2006.01)
*G05B 15/02* (2006.01)
*G05B 13/02* (2006.01)

(52) U.S. Cl.
CPC ............ *G06F 13/00* (2013.01); *G08C 17/02* (2013.01); *H04L 12/2825* (2013.01); *H04L 12/2829* (2013.01); *H04M 11/00* (2013.01); *H04M 11/005* (2013.01); *H04Q 9/00* (2013.01); *G05B 2219/2642* (2013.01); *G08C 2201/30* (2013.01); *G08C 2201/40* (2013.01); *G08C 2201/61* (2013.01); *H04L 2012/285* (2013.01); *H04L 2012/2841* (2013.01)

(58) Field of Classification Search
CPC ............ H04L 2012/2841; G05B 15/02; G05B 13/024; G05B 2219/2642; H04M 11/005; H04M 11/00; G08C 17/02; G08C 2201/61; G08C 2201/40; G08C 2201/30; G06F 13/00; H04Q 9/00
USPC .......................................................... 700/40
See application file for complete search history.

(56) References Cited

U.S. PATENT DOCUMENTS

| | | | |
|---|---|---|---|
| 2011/0003601 A1* | 1/2011 | Coutts | G08B 21/0415 455/456.1 |
| 2012/0086868 A1* | 4/2012 | Takaya | H04N 5/4403 348/734 |
| 2014/0095164 A1 | 4/2014 | Sone et al. | |
| 2014/0095635 A1 | 4/2014 | Yoshimoto et al. | |
| 2014/0167929 A1* | 6/2014 | Shim | G08C 17/02 340/12.5 |
| 2015/0188724 A1* | 7/2015 | Kim | G06F 3/048 340/3.71 |
| 2016/0105847 A1* | 4/2016 | Smith | H04L 67/125 370/252 |

FOREIGN PATENT DOCUMENTS

| | | |
|---|---|---|
| JP | 07-307807 A | 11/1995 |
| JP | 2003-078525 A | 3/2003 |
| JP | 2006-203516 A | 8/2006 |
| JP | 2006-235886 A | 9/2006 |
| JP | 2014-072869 A | 4/2014 |

\* cited by examiner

FIG. 4

| HOUSE ID | TERMINAL ID |
|---|---|
| H0001 | P0001 |
|  | P0002 |
|  | P0003 |
| H0002 | P0004 |
| ⋮ | ⋮ |

| HOUSE ID | APPLIANCE ID | HOUSE-SITTING SETTING | TRIGGER |
|---|---|---|---|
| H0001 | A0001 (REFRIGERATOR) | ON | OPENING OF DOOR |
| | A0002 (AIR CONDITIONER) | ON | OPERATION BY REMOTE CONTROLLER |
| | A0003 (WASHING MACHINE) | ON | PRESSING OF SPEAKING BUTTON |
| | A0004 (MICROWAVE OVEN) | ON | OPENING OF DOOR |
| H0002 | A0005 (REFRIGERATOR) | OFF | OPENING OF DOOR |
| | A0006 (AIR CONDITIONER) | OFF | OPERATION BY REMOTE CONTROLLER |
| | A0007 (WASHING MACHINE) | OFF | PRESSING OF SPEAKING BUTTON |
| H0003 | A0008 (REFRIGERATOR) | ON | OPENING OF DOOR |
| | A0009 (AIR PURIFIER) | OFF | CHANGING OF OPERATION MODE BY BUTTON OF APPLIANCE |
| ⋮ | | | ⋮ |

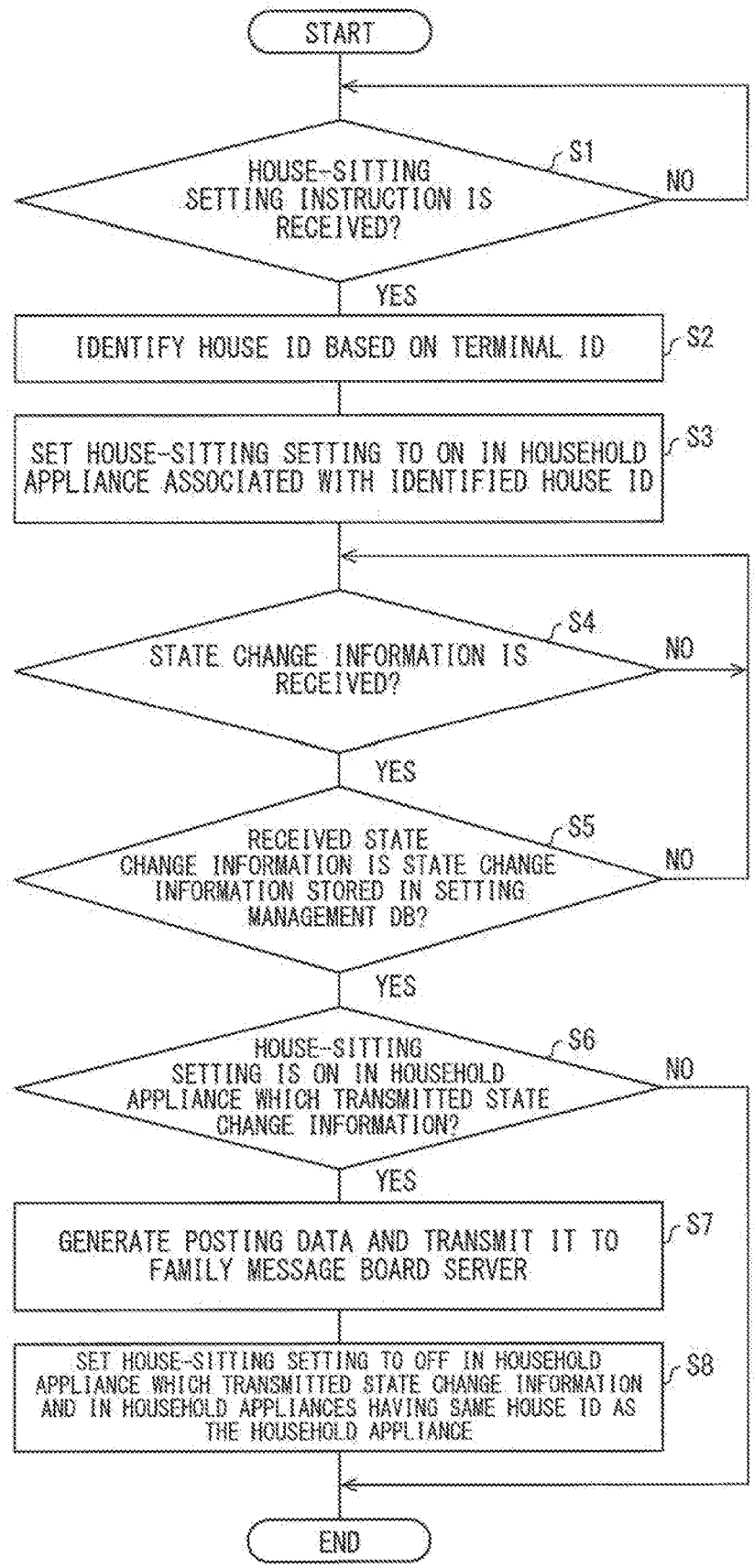

FIG. 18

| IMAGE ID | HOUSE-SITTING SETTING | ACTION CONTENT |
|---|---|---|
| P0001 | ON | COOLING OPERATION AT SETTING TEMPERATURE OF 28 DEGREES |
| | OFF | COOLING OPERATION AT SETTING TEMPERATURE OF 26 DEGREES |
| : | : | : |

CONTROL DEVICE, STORAGE MEDIUM, CONTROL METHOD FOR CONTROL DEVICE, CONTROL SYSTEM, TERMINAL DEVICE, AND CONTROLLED DEVICE

TECHNICAL FIELD

The present invention relates to a control device for controlling an action of a control target device in a mode which corresponds to a state of a user among a plurality of modes, and the like.

BACKGROUND ART

In recent years, a technique has been widely developed for achieving an additional function in a household electrical appliance (hereinafter, referred to as "household appliance") by controlling the household appliance by a control device such as a server. For example, according to a technique in Patent Literature 1, a message to a user is transmitted, as a message from a household appliance, to a server (hereinafter, referred to as "family message board server") which provides a communication service in which messages written by members are displayed on a time-series basis. Thus, artificial communications between a user and the household appliance are achieved in the communication service as an additional function of the household appliance. Besides that, developments are proceeding in techniques such as a technique in which a household appliance is caused to output audio and a technique in which an operation instruction is transmitted to a household appliance via a control device from a mobile terminal such as a smart phone so that a user remotely controls the household appliance.

CITATION LIST

Patent Literature

[Patent Literature 1]
Japanese Patent Application Publication Tokukai No. 2014-72869 (Publication date: Apr. 21, 2014)

SUMMARY OF INVENTION

Technical Problem

However, in the technique of Patent Literature 1, the same message is transmitted regardless of a state of the user (e.g., whether the user is out or is at home). That is, the conventional technique has a problem of insufficiency in controlling the household appliance in accordance with a state of the user.

The present invention is accomplished in view of the problem, and its object is to provide a control device and the like for controlling a household appliance in accordance with a state of a user.

Solution to Problem

In order to attain the object, the control device in accordance with an aspect of the present invention is a control device for controlling an action of a control target device in a mode which corresponds to a state of a user among a plurality of modes, and includes: a mode identifying section for identifying the mode; and a process executing section for executing a process in accordance with the mode which has been identified by the mode identifying section.

Moreover, in order to attain the object, the control method in accordance with an aspect of the present invention is a method for controlling a control device which controls an action of a control target device in a mode which corresponds to a state of a user among a plurality of modes, the control device including the steps of; (a) identifying the mode; and (b) executing a process in accordance with the mode which has been identified in the step (a).

Moreover, in order to attain the object, the control system in accordance with an aspect of the present invention includes: a control target device; and a control device which controls an action of the control target device in a mode which corresponds to a state of a user among a plurality of modes, the control device specifying the mode and executing a process in accordance with the mode thus identified.

Moreover, in order to attain the object, the terminal device in accordance with an aspect of the present invention is a terminal device which (i) obtains an operation of selecting an image among a plurality of images which are associated with respective execution instructions on actions to be executed by a control target device and (ii) transmits, to a control device, an execution instruction on an action corresponding to the image which has been selected, the control device obtaining the execution instruction associated with the image which has been selected from among the plurality of images and controlling an action of the control target device in a mode corresponding to a state of a user among a plurality of modes, in which: the terminal device displays images indicative of execution instructions on actions which the control device in a current mode can instruct the control target device to execute, the images being displayed so as to be selected by the user.

Moreover, in order to attain the object, the control target device in accordance with an aspect of the present invention is a control target device whose action is controlled by a control device for executing a process in a mode which corresponds to a state of a user among a plurality of modes, in which: the control target device executes an action which (i) is indicated by an instruction from the control device and (ii) corresponds to a current mode of the control device.

Advantageous Effects of Invention

According to an aspect of the present invention, it is possible to bring about an effect of providing a control device and the like for controlling a household appliance in accordance with a state of a user.

BRIEF DESCRIPTION OF DRAWINGS

FIG. 4 is a view illustrating a data structure and a specific example of a terminal management database that is stored in a storage section of the agent server illustrated in FIG. 1.

FIG. 5 is a view illustrating a data structure and a specific example of a terminal management database that is stored in a storage section of the agent server illustrated in FIG. 1.

FIG. 6 is a flowchart showing a flow of processes executed by the agent server illustrated in FIG. 1.

FIG. 18 is a view illustrating a data structure and a specific example of an action management database that is stored in a storage section of the agent server illustrated in FIG. 17.

FIG. 20 is a block diagram exemplifying a configuration of a computer which can be used as the agent server and the like.

DESCRIPTION OF EMBODIMENTS

Embodiment 1

The following description will discuss an embodiment (Embodiment 1) of the present invention with reference to FIGS. 1 through 6.

(Family Message Board System 10)

Figure 2:
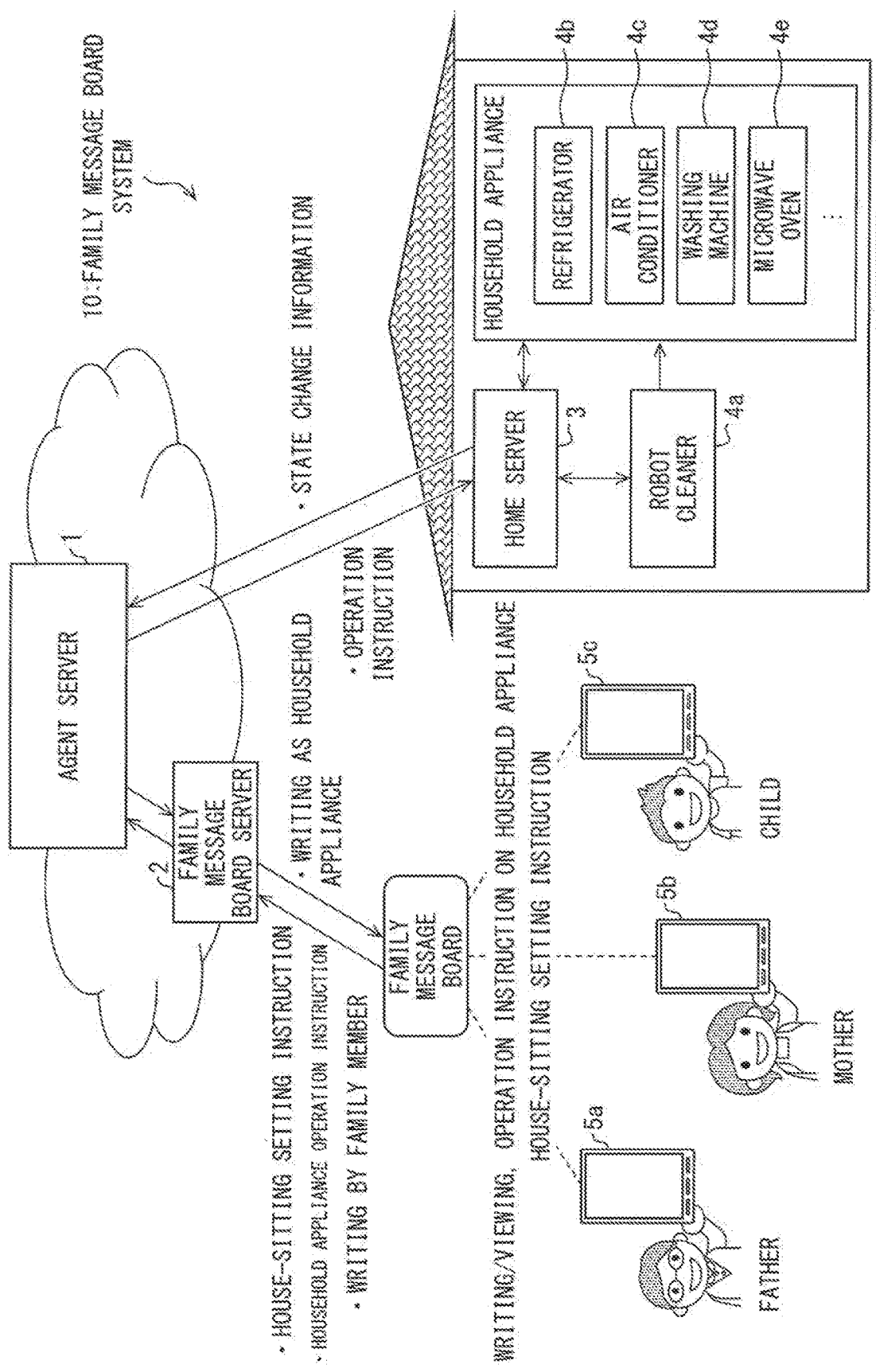
FIG. 2 is a view schematically illustrating a family message board system in accordance with embodiments of the present invention.

First, the following schematically describes a family message board system 10 (control system) in accordance with the Embodiment 1 with reference to FIG. 2. FIG. 2 is a view schematically illustrating the family message board system 10. The family message board system 10 is a system which provides an electronic message board (so-called social networking service; hereinafter referred to as "family message board") with which users (in an example shown in FIG. 2, a father, a mother, and a child) who have been registered in advance can share information. The family message board system 10 includes an agent server 1 (control device), a family message board server 2 (service providing server), a home server 3, household appliances 4 (robot cleaner 4a, refrigerator 4b, air conditioner 4c, a washing machine 4d, microwave oven 4e), and mobile terminals 5a, 5b, and 5c. Note that types and the number of the household appliances 4 are not limited to the example illustrated in FIG. 2. Moreover, in a case where the mobile terminals 5a, 5b, and 5c do not particularly need to be distinguished from each other, the mobile terminals 5a, 5b, and 5c are simply referred to as "mobile terminal 5 (terminal device)".

In the family message board (communication service a plurality of groups can be set, and the users are registered in each of the groups. Each of users can access only a family message board of a group on which the user has been registered, and can write a message to that family message board and view messages.

The agent server 1 receives, from the mobile terminal 5 via the family message board server 2, an instruction indicated by an image selected image) posted on the family message board, and transmits, to the home server 3, instruction information for controlling the household appliance 4 (control target device) in accordance with the instruction. That is, the agent server 1 transmits instruction information to the home server 3, and thus controls an action of the household appliance 4 which is the control target.

Moreover, the agent server 1 receives, from the mobile terminal 5 via the family message board server 2, a house-sitting setting instruction or a house-sitting setting cancelling instruction which is indicated by an image posted on the family message board, and sets the house-sitting setting to ON or OFF in accordance with the instruction. This will be described later in detail.

Moreover, the agent server 1 writes, as a character created by personifying each of the household appliances 4, a message and the like on the family message board in accordance with a state of the household appliance 4, information which the household appliance 4 has obtained, contents written by the users, and the like. With those processes, the users can experience artificial communications with the household appliances 4 through the family message board.

The family message board server 2 carries out overall processes in relation to the family message board, such as presentation of a display screen of the family message board to the mobile terminal 5 and management of writing of messages.

The home server 3 comprehensively controls transmission/reception of data between each of the household appliances 4 and the agent server 1. The home server 3 is wirelessly connected with the household appliances 4 such that communication can be made between the home server 3 and the household appliances 4. The home server 3 controls an action of each of the household appliances 4 in accordance with an operation instruction which has been received from the agent server 1. Specifically, the home server 3 transmits an operation instruction, which has been received from the agent server 1, to the household appliances 4, and thus controls actions of the household appliances 4. Moreover, the home server 3 transmits, to the agent server 1, state change information which has been obtained from the household appliances 4. Note that the state change information will be described later in detail.

Each of the household appliances 4 executes a predetermined process in accordance with an operation instruction which has been received from the home server 3. Note that the robot cleaner 4a can receive all operation instructions from the home server 3. In this case, the robot cleaner 4a identifies a destination (i.e., a household appliance 4 which is to be controlled by an operation instruction) of the operation instruction which the robot cleaner 4a has received, and transmits the operation instruction to that household appliance 4.

In a case where a state of the household appliance 4 has changed, the household appliance 4 generates state change information and transmits the state change information to the home server 3. Here, the case where the state of the household appliance has changed encompasses the following cases: that is, a case where the household appliance 4 has received an operation instruction from the agent server 1, a case where data externally obtained with use of a sensor or the like has satisfied a predetermined condition; a case where the household appliance 4 has been operated by a user without using the agent server 1; and the like. Note, however, that the cases are not limited to those. The state change information is information which indicates a content of the change in state of the household appliance 4. Examples of the state change information encompass: information which indicates that the household appliance 4 has received some sort of operation instruction from the agent server 1 and executed a process based on the instruction; information which indicates that a user has pressed a button which is provided in the household appliance 4; and the like. Note, however, that the state change information is not limited to those examples. The state change information is transmitted together with information (appliance ID described later) for identifying the household appliance 4.

The mobile terminal 5 controls the household appliances 4 via servers (i.e., the agent server 1, the family message board server 2, and the home server 3). The user operates the mobile terminal 5 so as to select an intended image from among images (hereinafter, referred to as "seal image") which are displayed on the mobile terminal 5 and indicate respective operation instructions with respect to the household appliance 4 (that is, the user posts the seal image on the family message board). As such, the user can operate the household appliance 4.

The user can access the family message board by operating the mobile terminal 5 so as to write a message or to view messages.

The user can set the house-sitting setting of the household appliance 4 to "ON" or "OFF", which is managed by the agent server 1, by posting a seal image which indicates a house-sitting setting instruction on the family message board by operating the mobile terminal 5.

Note that "setting the house-sitting setting to "ON"" means to set information to "ON", which information indicates the house-sitting setting and is associated with information for identifying the household appliance 4 which is managed by the agent server 1. As such, the household appliance 4 is managed by the agent server 1 as being in a mode (first mode) which defines an action of the agent server 1 in a state in which the user cannot operate the household appliance 4 without using the agent server 1.

Meanwhile, "setting the house-sitting setting to "OFF"" means to set information to "OFF", which information indicates the house-sitting setting and is associated with information for identifying the household appliance 4 which is managed by the agent server 1. As such, the household appliance 4 is managed by the agent server 1 as being in a mode (second mode) which defines an action of the agent server 1 in a state in which the user can operate the household appliance 4 without using the agent server 1.

Figure 3:
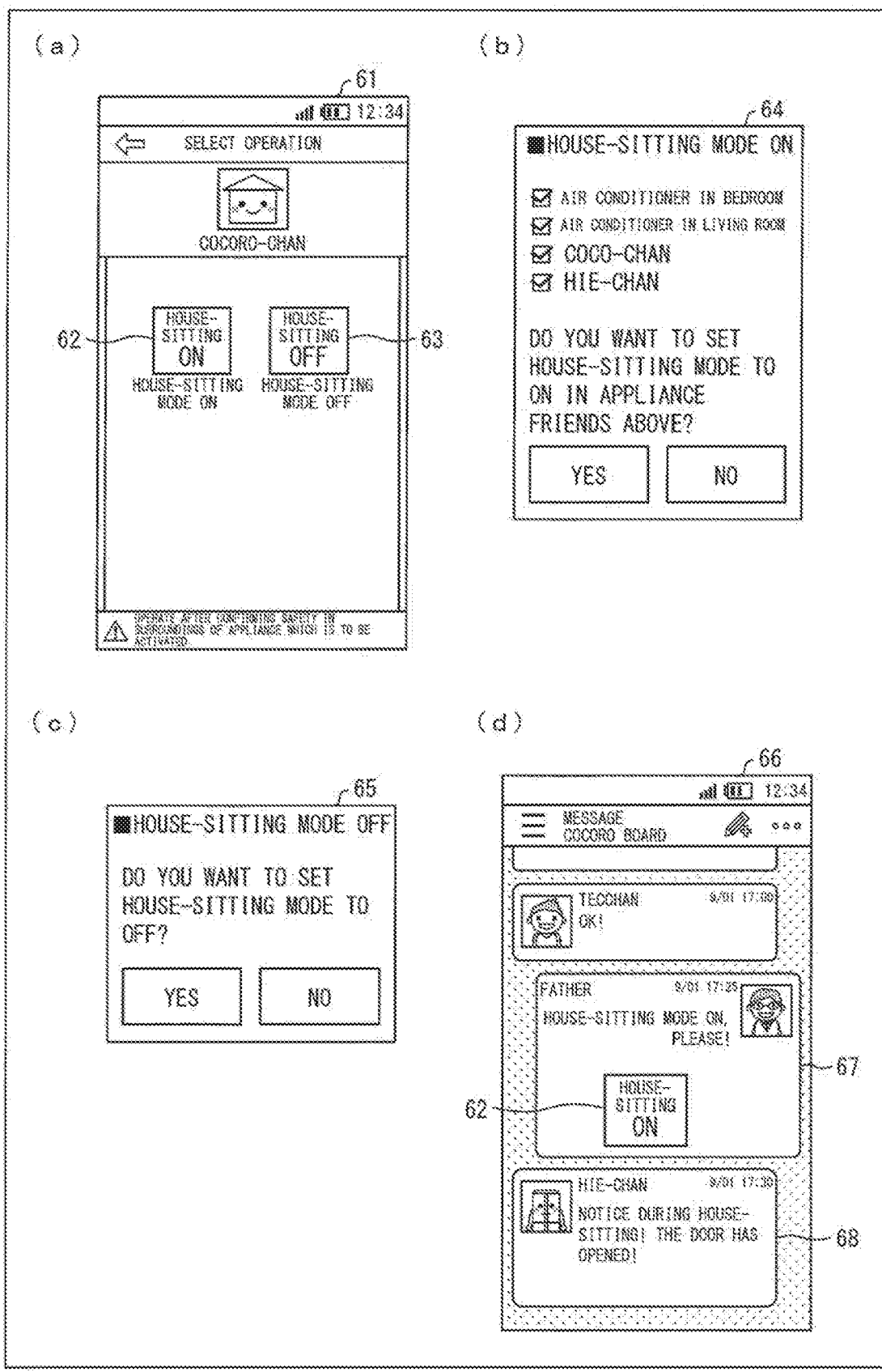
FIG. 3 is a transition diagram showing a flow of giving a house-sitting setting instruction from the mobile terminal to the agent server illustrated in FIG. 1.

Here, the following description will discuss a flow of giving an instruction on the house-sitting setting with reference to FIG. 3. FIG. 3 is a transition diagram showing a flow of giving a house-sitting setting instruction from the mobile terminal 5 to the agent server 1. (a) of FIG. 3 shows a selection screen 61 for selecting seal images which indicate respective house-sitting setting instructions. The selection screen 61 displays a seal image 62 for setting the house-sitting setting to "ON" and a seal image 63 for setting the house-sitting setting to "OFF".

In a case where the user has selected the seal image 62, the mobile terminal 5 displays a confirmation image 64 which is shown in (b) of FIG. 3. The confirmation image 64 is an image which indicates, to the user, household appliances 4 whose house-sitting setting is to be set to "ON" and is used to determine posting of the seal image 62. A button on which a character string of "YES" is provided is a button for posting the seal image 62 so as to transmit, to the agent server 1, an instruction (house-sitting setting instruction) on setting the house-sitting settings of the household appliances 4 displayed in the confirmation image 64 to "ON". Here, the house-sitting setting instruction is an instruction on setting the house-sitting setting to "ON", and is transmitted together with information (i.e., terminal ID, described later) for identifying the mobile terminal 5. Meanwhile, a button on which a character string of "NO" is provided is a button for cancelling posting of the seal image 62.

Note that it is possible to employ a configuration in which the user can select a household appliance 4 whose house-sitting setting is to be set to "ON". That is, in accordance with an operation by the user, the mobile terminal 5 switches display/non-display of a check mark in a check box which is provided on a left side of a character string indicating each of the household appliances 4. Here, household appliances 4 for which check marks are respectively indicated are household appliances 4 whose house-sitting setting is to be set to "ON". Meanwhile, household appliances 4 for which check marks are not provided are household appliances 4 whose house-sitting setting is not to be set to "ON" (i.e., remains "OFF"). Note that, in this example case, the house-sitting setting instruction is transmitted together with information (i.e., appliance ID, described later) for identifying the household appliances 4 whose house-sitting setting is to be set to "ON", in addition to the terminal ID. Details of processes carried out by the agent server 1 in this example case will be described later in Embodiment 4.

In this state, in a case where the user has selected the seal image 63, the mobile terminal 5 displays a confirmation image 65 illustrated in of FIG. 3. The confirmation image 65 is an image for setting a house-sitting setting of a household appliance 4, whose house-sitting setting is currently "ON", to "OFF". A button on which a character string of "YES" is provided is a button for posting the seal image 63 so as to transmit, to the agent server 1, an instruction on setting the house-sitting setting of the household appliance 4, whose house-sitting setting is currently "ON", to "OFF". Note that, in a case where the user has selected the button of "YES" in the confirmation image 65, the mobile terminal 5 in accordance with Embodiment 1 transmits, to the agent server 1, an instruction (house-sitting setting cancelling instruction) on setting the house-sitting setting of all the household appliances 4, whose house-sitting setting is currently "ON", to "OFF". However, the process executed by the mobile terminal 5 is not limited to this example. For example, in a case where the user has selected the button of "YES", it is possible that a screen is displayed for selecting a household appliance 4 whose house-sitting setting is to be set to "OFF". The house-sitting setting cancelling instruction is an instruction on setting the house-sitting setting to "OFF" and is transmitted together with a terminal ID of the mobile terminal 5. Note that, in a case where a household appliance 4 whose house-sitting setting is to be set to "OFF" can be selected, the house-sitting setting cancelling instruction is transmitted together with an appliance ID of the household appliance 4 whose house-sitting setting is to be set to OFF, in addition to the terminal ID. Meanwhile, a button on which a character string of "NO" is provided is a button for cancelling posting of the seal image 63.

In a case where the button of "YES" is selected in the confirmation image 64, the mobile terminal 5 displays a time line 66 illustrated in (d) of FIG. 3. The time line 66 is an image showing, on a time-series basis, messages which have been posted on the family message board. In an example illustrated in (d) of FIG. 3, a posted image 67 is displayed which indicates that the father has posted the seal image 62. From this, in the agent server 1, the house-sitting setting of household appliances 4 is set to ON. Note that, in Embodiment 1, an example is described in which, in a case where a predetermined operation has been made with respect to a household appliance 4 whose house-sitting setting is "ON", a message which indicates the fact is posted on the family message board. That is, as illustrated in (d) of FIG. 3, a posted image 68 which indicates that a door of the refrigerator 4b whose house-sitting setting is "ON" has opened is displayed in the time line 66. The posting of messages will be described later in detail.

(Details of Configuration)

Figure 1:
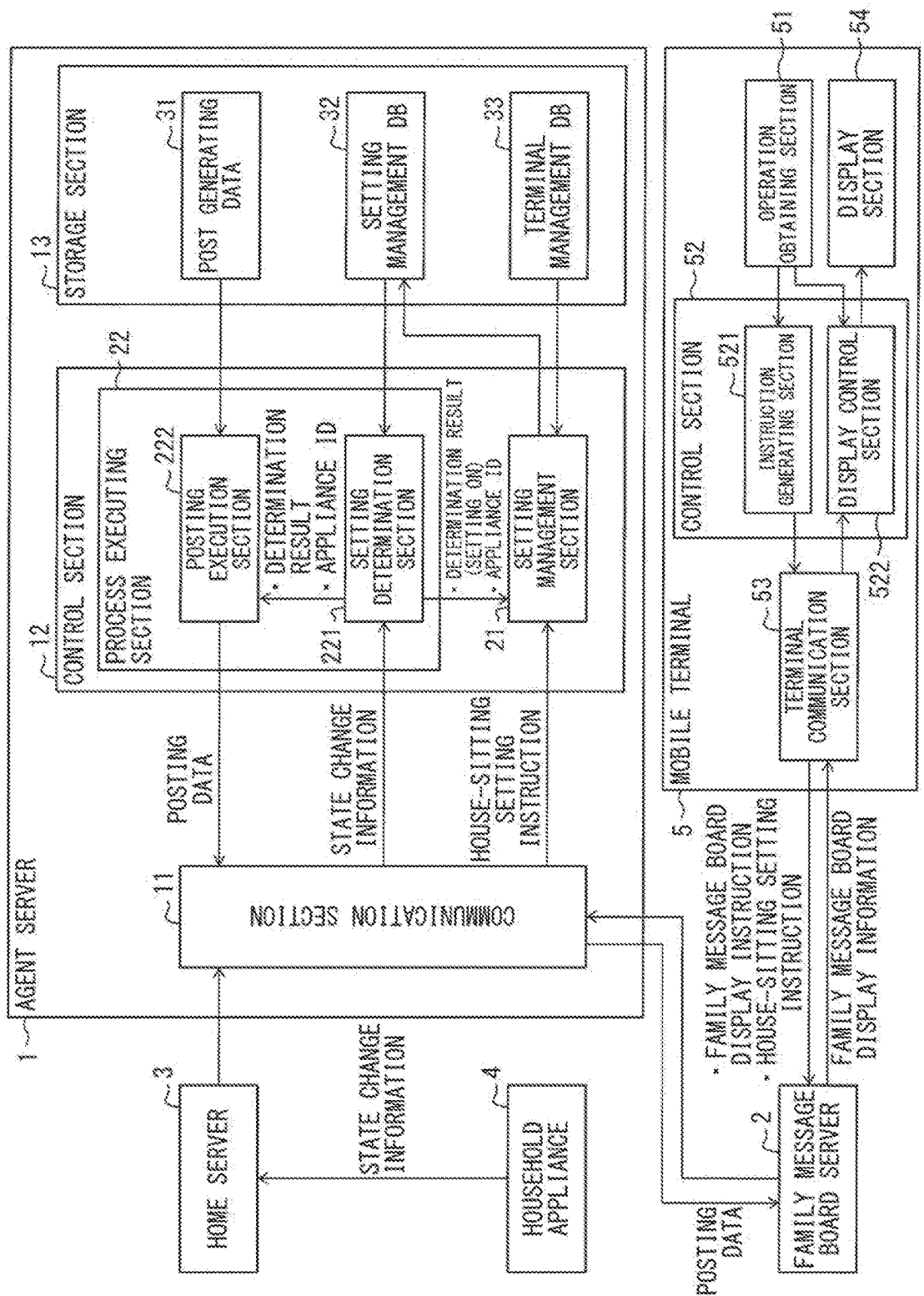
FIG. 1 is a block diagram illustrating main configurations of an agent server and a mobile terminal in accordance with Embodiment 1 of the present invention.

The following description will discuss details of the agent server 1 and the mobile terminal 5 in the family message board system 10 with reference to FIG. 1. FIG. 1 is a block diagram illustrating an example of main configurations of the agent server 1 and the mobile terminal 5. Note that parts (e.g., a part of the mobile terminal 5 which part achieves telephone calls with use of a telephone line, and the like) which are less relevant to the present invention are omitted from the following descriptions and the block diagram of FIG. 1.

Moreover, details of configurations of the family message board server 2, the home server 3, and the household appliances 4 are also not described because those are less relevant to the present invention.

(Agent Server 1)

As illustrated in FIG. 1, the agent server 1 includes a communication section 11, a control section 12, and a storage section 13.

The communication section 11 carries out communications with the family message board server and the home server 3. Specifically, the communication section 11 receives a house-sitting setting instruction or a house-sitting setting cancelling instruction (not illustrated) which has been transmitted from the mobile terminal 5 via the family message board server 2, and outputs the instruction to a setting management section 21 which will be described later. Moreover, the communication section 11 receives state change information which has been transmitted from the household appliance 4 via the home server 3, and outputs the information to a setting determination section 221 which will be described later. Moreover, the communication section 11 transmits, to the family message board server 2, posted data which has been outputted from a posting execution section 222 which will be described later.

The storage section 13 stores various kinds of data which are used by the agent server 1. Specifically, the storage section 13 stores at least post generating data 31, a setting management database 32, and a terminal management database 33. Note that the pieces of data which are stored in the storage section 13 are not limited to those examples.

The post generating data 31 includes (i) text data indicating a content of a message posted on the family message board and (ii) image data indicating the household appliance 4. For example, the post generating data 31 includes text data of "Notice during house-sitting! The door has opened!" and image data of the refrigerator, which are included in the posted image 68 illustrated in (d) of FIG. 3. Moreover, the post generating data 31, which is used to generate a message (posting data) to be posted in a case where the house-sitting setting is "ON" and predetermined state change information has been received as in the above example, is managed for each piece of information (i.e., appliance ID described later) for identifying a household appliance 4. Note, however, that the post generating data 31 is not limited to the example.

In the terminal management database 33, a house ID which is information for identifying a group of the family message board is associated with a terminal ID which is information for identifying a mobile terminal 5 of a user who has been registered on each of groups. Here, the following description will discuss details of the terminal management database 33 with reference to FIG. 4. FIG. 4 is a view illustrating a specific example of a data structure of the terminal management database 33. Note, however, that the terminal management database 33 is not limited to the example shown in FIG. 4.

In a column of "house ID", house IDs are stored each of which is information for identifying a group of the family message board. In a column of "terminal ID", terminal IDs are stored each of which is information for identifying a mobile terminal 5. In the example shown in FIG. 4, each of the house IDs and the terminal IDs are constituted by an alphabetic letter and numerals. Note, however, that the house IDs and the terminal IDs are not limited to this example.

In the terminal management database 33 shown in FIG. 4, users of mobile terminals 5 respectively having terminal IDs of "P0001", "P0002", and "P0003" are registered on a group indicated by a house ID of "H0001". Moreover, a user of a mobile terminal 5 having a terminal ID of "P0004" is registered on a group indicated by a house ID of "H0002". That is, the user of the mobile terminal 5 having the terminal ID of "P0001" can access a family message board in the group having the house ID of "H0001" but cannot access a family message board in the group having the house ID of "H0002".

In the setting management database 32, information (appliance ID) for identifying a household appliance 4 is associated with information (hereinafter, simply referred to as "house-sitting setting") indicating a house-sitting setting. That is, the setting management database 32 is a database for managing whether the house-sitting setting of each of the household appliances 4 is ON or OFF. Here, details of the setting management database 32 are described with reference to FIG. 5. FIG. 5 is a view illustrating a specific example of a data structure of the setting management database 32. Note, however, that the setting management database 32 is not limited to the example shown in FIG. 5.

In the column of "house ID", the house IDs are stored. Note that details of the house ID have already been described, and are therefore not described here. In a column of "appliance ID", appliance IDs are stored each of which is information for identifying a household appliance 4. In the example shown in FIG. 5, each of the appliance IDs are constituted by an alphabetic letter and numerals. Note, however, that the appliance IDs are not limited to this example.

In a column of "house-sitting setting", flags are stored each of which indicates that the house-sitting setting is "ON" or "OFF". In the example shown in FIG. 5, each of the flags is indicated by "ON" or "OFF". Note, however, that the flags are not limited to this example. For example, the flags can be numerals or alphabetic letters which indicates that the house-sitting setting is "ON" or "OFF". Note that each of the flags stored in the column of "house-sitting setting" is changed from "ON" to "OFF" or from "OFF" to "ON" by the setting management section 21 (details will be described later).

In a column of "trigger", state change information is stored which serves as a trigger for executing a predetermined process in a case where the house-sitting setting is ON, among pieces of state change information which have been received from the household appliances 4. In Embodiment 1, the predetermined process is posting of a predetermined message on the family message board. That is, in a case where the agent server 1 has received state change information stored in the column of "trigger" and the house-sitting setting of a household appliance 4 indicated by the appliance ID is ON, the agent server 1 transmits, to the family message board server 2, data for posting a message.

The control section 12 comprehensively controls sections included in the agent server 1. The control section includes the setting management section 21 (mode identifying section) and a process executing section 22.

The setting management section 21 identifies house-sitting setting of each of the household appliances 4 in accordance with an external instruction. Specifically, the setting management section 21 receives the above described house-sitting setting instruction or the house-sitting setting cancelling instruction (not illustrated) from the communication section 11. In a case where the setting management section 21 has received the house-sitting setting instruction (or the house-sitting setting cancelling instruction), the setting management section 21 refers to the terminal management database 33 based on a terminal ID which has been received together with the house-sitting setting instruction (or the house-sitting setting cancelling instruction), and identifies a house ID which is associated with the terminal ID. Then, with reference to the setting management database 32 with use of the house ID which has been identified, the setting management section 21 identifies an appliance ID which is associated with the house ID. Lastly, the setting management section 21 sets the house-sitting setting, which is associated with each of appliance IDs, to "ON" (or "OFF").

Moreover, the setting management section 21 receives, from the setting determination section 221 described later, (i) the identified appliance IDs (of household appliances 4 whose state change information serving as a trigger for executing a predetermined process has been transmitted) and (ii) a determination result indicating that the house-sitting settings of the household appliances 4 are "ON". Then, in the setting management database 32, the house-sitting setting of the identified appliance ID is set to "OFF", and house-sitting settings of appliance IDs associated with a house ID, with which the identified appliance ID is associated, are set to "OFF".

The process executing section 22 executes a process in accordance with the house-sitting setting. The process executing section 22 includes the setting determination section 221 and the posting execution section 222.

The setting determination section 221 determines a house-sitting setting of a household appliance 4 whose state change information has been transmitted. Specifically, in a case where the setting determination section 221 has received state change information, the setting determination section 221 identifies, from the setting management database 32, an appliance ID which conforms to an appliance ID that has been received together with the state change information. Then, the setting determination section 221 determines whether or not information (which is stored in the column of "trigger") that is associated with the identified appliance ID conforms to the received state change information. In a case where the information does not conform to the received state change information, the setting determination section 221 ends the process.

On the other hand, in a case where the information conforms to the received state change information, the setting determination section 221 determines whether a house-sitting setting associated with the identified appliance ID is "ON" or "OFF", and outputs the determination result and the identified appliance ID to the posting execution section 222. In a case where the setting determination section 221 has determined that the house-sitting setting is "ON", the setting determination section 221 outputs the determination result and the identified appliance ID to the setting management section 21.

The posting execution section 222 transmits posting data (i.e., a message to be posted on the family message board) to the family message board server 2. Specifically, the posting execution section 222 receives (i) the determination result which indicates that the house-sitting setting is "ON" and (ii) the appliance ID which has been identified by the setting determination section 221. Then, the posting execution section 222 identifies post generating data 31 with use of the appliance ID, reads out the post generating data 31 thus identified, and set the post generating data 31 as posting data (first message). Then, the posting execution section 222 transmits the posting data to the family message board server 2 via the communication section 11.

On the other hand, in a case where the posting execution section 222 has received a determination result which indicates that the house-sitting setting is "OFF", the posting execution section 222 ends the process without generating posting data.

(Mobile Terminal 5)

As illustrated in FIG. 1, the mobile terminal 5 includes an operation obtaining section 51, a control section 52, a terminal communication section 53, and a display section 54.

The operation obtaining section 51 obtains a user operation, and outputs an input signal which is based on the operation to an instruction generating section 521 or a display control section 522 (which will be described later). The operation obtaining section 51 can be a physical button or can be a touch panel. Note that, in a case where the operation obtaining section 51 is a touch panel, the operation obtaining section 51 is integrated with the display section 54.

The terminal communication section 53 communicates with the family message board server 2. Specifically, the terminal communication section 53 transmits a house-sitting setting instruction or a house-sitting setting cancelling instruction (not illustrated), which has been outputted from the instruction generating section 521 (described later), to the agent server 1 via the family message board server 2. Moreover, the terminal communication section 53 (i) receives family message board display information which has been transmitted from the family message board server 2 and is used to display a family message board (specifically, the time line 66 illustrated in (d) of FIG. 3) on the mobile terminal 5, and (ii) outputs the family message board display information to the display control section 522 which will be described later.

The display section 54 displays various kinds of images which are inputted from the display control section 522 which will be described later. For example, the display section 54 displays each of the images illustrated in FIG. 3. In Embodiment 1, the display section 54 is assumed to be a liquid crystal display (LCD). However, the display section 54 is not limited to a liquid crystal display, provided that the device has a display function.

The control section 52 comprehensively controls sections included in the mobile terminal 5. The control section 52 includes an instruction generating section 521 and a display control section 522.

The instruction generating section 521 transmits, to the family message board server 2, a house-sitting setting instruction and a house-sitting setting cancelling instruction (mode determination instructions) for changing a house-sitting setting of each of the household appliances 4 which are managed by the agent server 1. For example, in a case where a house-sitting setting instruction is transmitted, the instruction generating section 521 receives, from the operation obtaining section 51, an input signal (which indicates that the button of "YES" illustrated in (b) of FIG. 3 has been selected) for generating a house-sitting setting instruction. Subsequently, the instruction generating section 521 reads out, from a table (seal image database, not illustrated) in which pieces of image data of seal images are associated with various instructions, image data of the seal image 62 and an instruction (house-sitting setting instruction) on setting the house-sitting setting to ON, and associates the instruction with a terminal ID. Then, the instruction generating section 521 transmits, to the family message board server 2, the house-sitting setting instruction, the terminal ID, and the image data of the seal image 62. Note that, although detailed descriptions are omitted, a similar process is carried out in regard to the house-sitting setting cancelling instruction. In accordance with the input signal which has been received from the operation obtaining section 51, the instruction generating section 521 generates an instruction other than the house-sitting setting instruction and the house-sitting setting cancelling instruction and transmits the instruction to the family message board server 2. The instruction can be, for example, a family message board display instruction for causing the mobile terminal 5 to display a family message board.

The display control section 522 controls the display section 54 to display various images. For example, in a case where the display control section 522 has received family message board display information from the terminal communication section 53, the display control section 522 generates an image (e.g., the time line 66 illustrated in (d) of FIG. 3) based on the information and controls the display section 54 to display the image. Moreover, based on the input signal from the operation obtaining section 51, the display control section 522 generates an image and controls the display section 54 to display the image.

(Flow of Processes Executed by the Agent Server 1)

The following description will discuss a flow of processes executed by the agent server 1, with reference to FIG. 6. FIG. 6 is a flowchart showing an example of a flow of processes executed by the agent server 1. Note that FIG. 6 shows processes in which the agent server 1 sets a house-sitting setting of a household appliance 4 to "ON", and then the agent server 1 receives state change information from the household appliance 4, and then the agent server transmits predetermined posting data to the family message board server 2.

First, the setting management section 21 is in a state of waiting for a house-sitting setting instruction (S1). In a case where the setting management section 21 has received a house-sitting setting instruction (YES in S1), the setting management section 21 refers to the terminal management database 33 and identifies a house ID based on a terminal ID included in the house-sitting setting instruction (S2). Subsequently, the setting management section 21 set a house-sitting setting of a household appliance 4, which is associated with the identified house ID, to "ON" (S3, mode identifying step). Specifically, the setting management section 21 sets, in the setting management database 32, a house-sitting setting of an appliance ID of the household appliance 4 which is associated with the identified house ID to "ON".

Next, the setting determination section 221 is in a state of waiting for state change information (S4). In a case where the setting determination section 221 has received state change information (YES in S4), the setting determination section 221 determines whether or not the received state change information is state change information which is stored in the setting management database 32 (S5). Specifically, the setting determination section 221 determines whether or not information (which is stored in the column of "trigger" in the setting management database 32 shown in FIG. 5) associated with the appliance ID received together with the state change information conforms to the received state change information. In a case where the information does not conform to the received state change information (NO in S5), the setting determination section 221 returns to the step S4 and enters the state of waiting for state change information again.

On the other hand, in a case where the information conforms to the received state change information (YES in S5), the setting determination section 221 determines whether the house-sitting setting of the household appliance 4, whose state change information has been transmitted, is "ON" or "OFF" (S6). Specifically, the setting determination section 221 refers to the setting management database 32 and determines whether the house-sitting setting associated with the received appliance ID is "ON" or "OFF". Then, the setting determination section 221 outputs the determination result and the received appliance ID to the posting execution section 222.

In a case where the determination result indicates that the house-sitting setting is "ON" (YES in S6), the posting execution section 222 generates posting data and transmits the posting data to the family message board server 2 (S7, process executing step). Specifically, the posting execution section 222 reads out the post generating data 31 (including image data of the refrigerator and text data of "Notice during house-sitting! The door has opened!") for posting the posted image 68 illustrated in (d) of FIG. 3, and transmits the post generating data 31 to the family message board server 2. From this, members of the family message board can know that somebody opened the refrigerator (i.e., somebody has returned home).

In a case where the setting determination section 221 has determined that the house-sitting setting is "ON", the setting determination section 221 outputs the determination result and the received appliance ID to the setting management section 21. The setting management section 21 sets, in the setting management database 32, house-sitting settings of the household appliance 4 whose state change information has been transmitted and of a household appliance whose ID is identical with that of the household appliance 4 to "OFF" based on the received determination result and appliance ID (S8). Note that the process of the step S8 can be carried out before the process of the step S7 or can be carried out concurrently with the process of the step S7.

On the other hand, in a case where the determination result indicates that the house-sitting setting is "OFF" (NO in S6), the posting execution section 222 does not generate posting data and ends the process.

Note that, in Embodiment 1, the example has been described in which, in a case where the setting determination section 221 has determined that the house-sitting setting of the household appliance 4 whose state change information has been transmitted is "ON", the setting determination section 221 notifies the setting management section 21 of the determination result, and then the setting management section 21 sets house-sitting settings of the household appliance 4 and of a household appliance 4 whose house ID is identical with that of the household appliance 4 to "OFF". Alternatively, it is possible to employ a configuration in which, in a case where the posting execution section 222 has transmitted posting data, the posting execution section 222 notifies the setting management section 21 of the transmission of the posting data, and then the setting management section 21 sets house-sitting settings of the household appliance 4 and of a household appliance 4 whose house ID is identical with that of the household appliance 4 to "OFF". This modification example is applicable also to Embodiment 2 which will be described later.

The agent server 1 can have a function to control audio output of the household appliances 4. For example, the agent server 1 can instruct a household appliance 4, whose house-sitting setting has been set to ON by the setting management section 21, not to execute audio output. In this case, the household appliance 4 does not output audio in a case where no user is at home, and this makes it possible to prevent unnecessary audio output.

As such, in a case where the house-sitting setting is "ON", the agent server 1 can post a message on the family message board in accordance with the state in which users are out. Moreover, the agent server 1 stores, in advance, appliance IDs and pieces of state change information each of which serves as a trigger for transmission of posting data so that the appliance IDs and the pieces of state change information are associated with each other, and uses the appliance IDs and pieces of state change information for determining whether or not transmission of posting data, which indicates that somebody has returned home, is to be executed. From this, it is possible to carry out a process of transmitting posting data which indicates that somebody has returned home, without detecting whether or not a user has returned home with use of a dedicated sensor. Moreover, each of the pieces of state change information serving as triggers and the appliance IDs which are stored is associated with a flag indicative of a current house-sitting setting, and this makes it possible to determine whether the house-sitting setting of the household appliance 4 is "ON" or "OFF", regardless of a type of the household appliance 4.

In the family message board system 10 in accordance with Embodiment 1, house-sitting settings are managed by the agent server 1 as above described. From this, it is possible to switch "ON" and "OFF" of the house-sitting setting in the family message board system 10, without providing the household appliance 4 with a function to switch the house-sitting setting.

Embodiment 2

Figure 7:
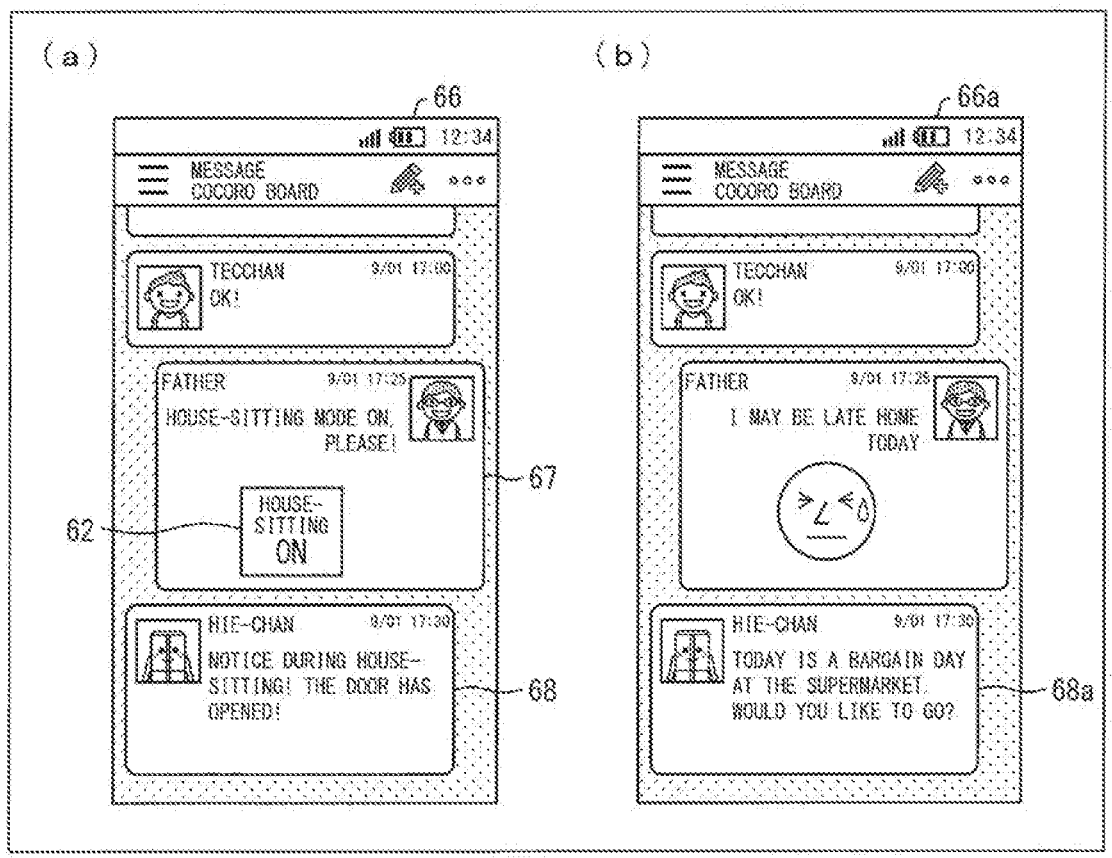
FIG. 7 illustrates a screen displayed on a mobile terminal in accordance with Embodiment 2 of the present invention. (a) of FIG. 7 illustrates a screen displayed in a case where a house-sitting setting of a household appliance is ON, and (b) of FIG. 7 illustrates a screen displayed in a case where the house-sitting setting of the household appliance is OFF.
Figure 8:
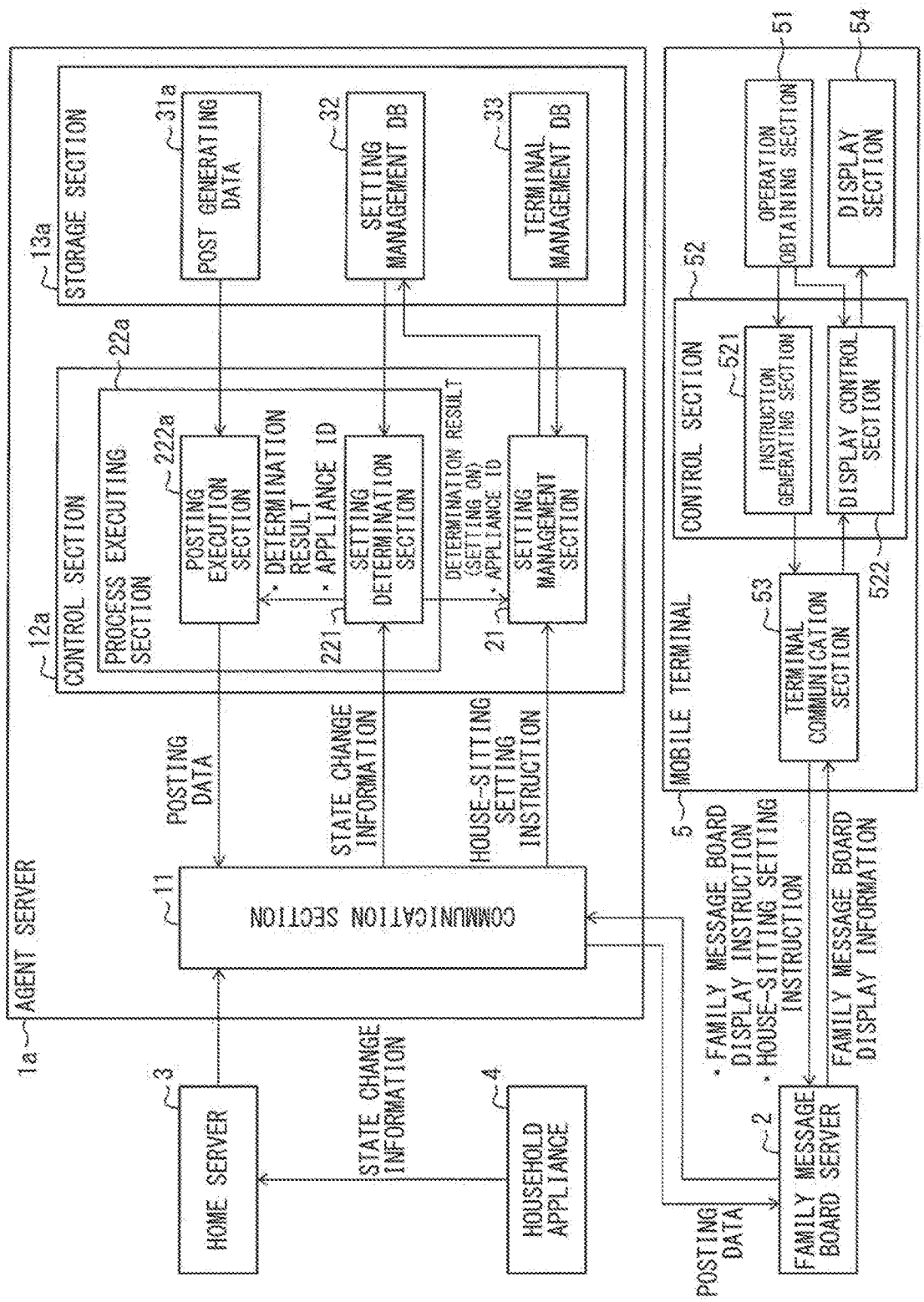
FIG. 8 is a block diagram illustrating main configurations of an agent server and a mobile terminal in accordance with Embodiment 2 of the present invention.
Figure 9:
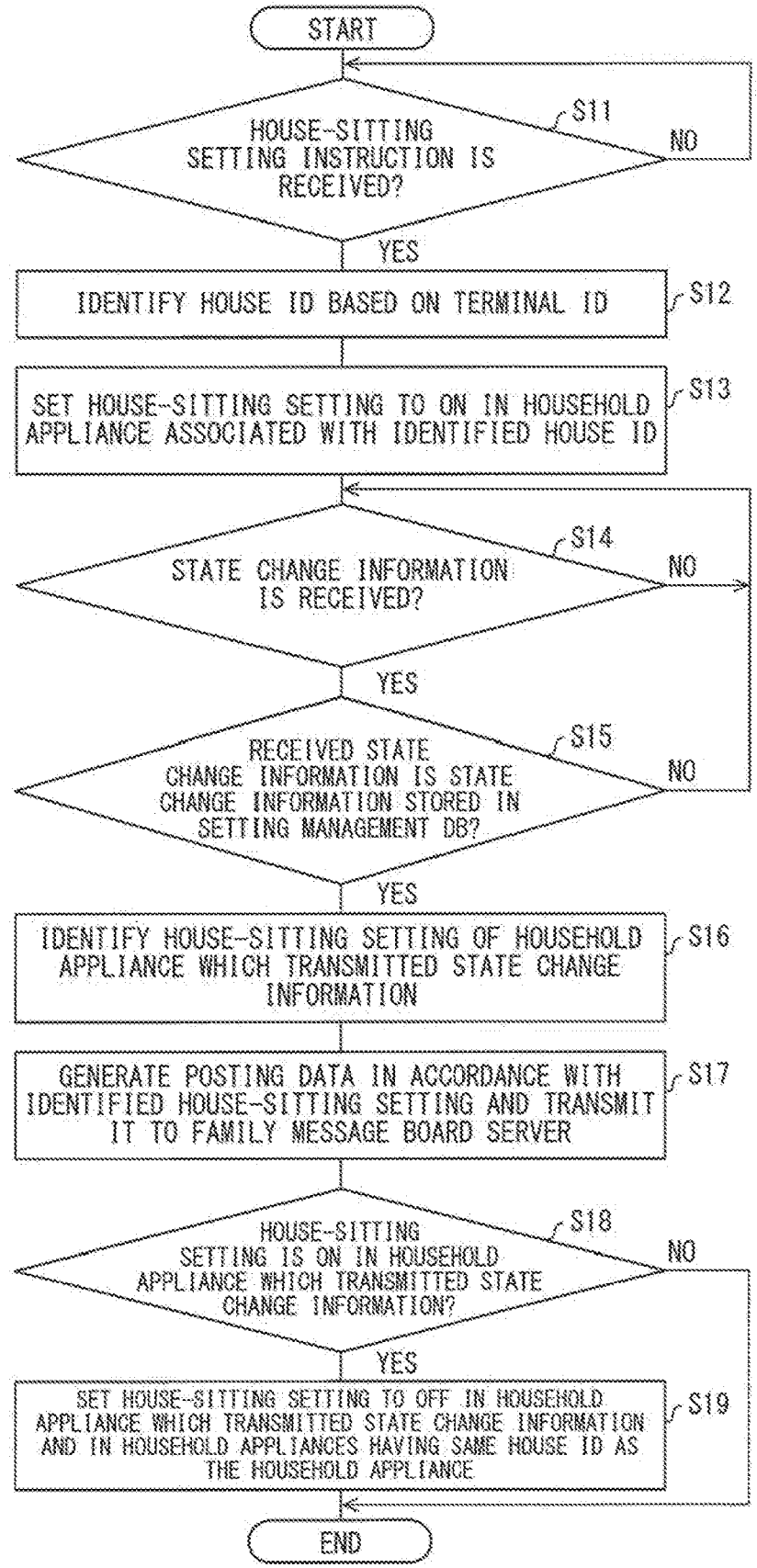
FIG. 9 is a flowchart showing a flow of processes executed by the agent server illustrated in FIG. 8.

The following description will discuss another embodiment (Embodiment 2) of the present invention with reference to FIGS. 7 through 9. Note that, for convenience of explanation, members identical in function to those described in the above Embodiment 1 are given identical reference numerals, and descriptions of those members are omitted.

An agent server 1a in accordance with Embodiment 2 generates posting data and transmits the posting data to the family message board server 2 even in a case where a house-sitting setting of a household appliance 4, whose state change information has been transmitted, is "OFF", unlike the agent server 1 described in Embodiment 1. Note, however, that, in a case where the house-sitting setting is "OFF", the agent server 1a transmits, to the family message board server 2, posting data which is different from posting data that is transmitted in a case where the house-sitting setting is "ON".

(Overview of Embodiment 2)

Here, the following description will discuss an overview of Embodiment 2 with reference to FIG. 7 in detail. FIG. 7 illustrates a screen displayed on a mobile terminal 5 in accordance with Embodiment 2.

(a) of FIG. 7 illustrates a time line 66 displayed in a case where a house-sitting setting of a household appliance 4 (refrigerator 4b) is set to ON by a user with use of the mobile terminal 5. That is, the time line 66 in (a) of FIG. 7 is identical with that illustrated in (d) of FIG. 3. As with the agent server 1 in accordance with Embodiment 1, in a case where the house-sitting setting is "ON", the agent server 1a receives state change information indicating that a door of the refrigerator 4b has opened. Then, the agent server 1a generates posting data which includes text data of "Notice during house-sitting! The door has opened!", and transmits the posting data to the family message board server 2. From this, in the time line 66, a posted image 68 is displayed based on the posting data.

Meanwhile, (b) of FIG. 7 illustrates a time line 66a displayed after the agent server 1a has received state change information indicating that the door of the refrigerator 4b has opened, in a case where the house-sitting setting of the refrigerator 4b is "OFF". In a case where the agent server 1a has received the state change information, the agent server 1a generates posting data which includes text data of "Today is a bargain day at the supermarket. Would you like to go?" which is different from that in the case where the house-sitting setting is "ON", and transmits the posting data to the family message board server 2. From this, in the time line 66a, a posted image 68a is displayed based on the posting data.

As such, in Embodiment 2, a content of a message posted on the family message board is different depending on whether the house-sitting setting of the household appliance is "ON" or "OFF". This makes it possible to change a content of a message depending on whether the user is in a state in which the user cannot operate the household appliance 4 without using the agent server 1a or is in a state in which the user can operate the household appliance 4 without using the agent server 1a. Therefore, it is possible to achieve more realistic communications.

Note that a content of a message which is posted on the family message board depending on whether the house-sitting setting of the household appliance is "ON" or "OFF" is not limited to the example illustrated in FIG. 7.

(Agent Server 1a)

The following description will discuss details of a configuration of the agent server 1a in accordance with Embodiment 2, with reference to FIG. 8. FIG. 8 is a block diagram illustrating an example of main configurations of the agent server 1a and the mobile terminal 5. Note that details of the mobile terminal 5 have already been described in Embodiment 1, and are therefore not described here.

As illustrated in FIG. 8, the agent server 1a includes a control section 12a instead of the control section 12 and a storage section 13a instead of the storage section 13, as compared with the agent server 1 in accordance with Embodiment 1.

In Embodiment 2, the control section 12a includes a process executing section 22a instead of the process executing section 22, as compared with the control section in accordance with Embodiment 1. Moreover, the storage section 13a stores post generating data 31a instead of the post generating data 31, as compared with the storage section 13 in accordance with Embodiment 1.

The post generating data 31a includes, in addition to post generating data included in the post generating data 31 described in Embodiment 1, post generating data for generating a message (posting data) which is managed for each appliance ID and is to be posted in a case where the house-sitting setting is "OFF" and predetermined state change information has been received. Note that, in Embodiment 2, the post generating data that is used in a case where the house-sitting setting is ON is referred to as first post generating data 31a, and the post generating data that is used in a case where the house-sitting setting is "OFF" is referred to as second post generating data 31a, and thus those pieces of data are distinguished.

The process executing section 22a includes a posting execution section 222a instead of the posting execution section 222, as compared with the process executing section 22 in accordance with Embodiment 1. In a case where the posting execution section 222a has obtained a determination result indicating that the house-sitting setting is "ON" and an appliance ID identified by the setting determination section 221, the posting execution section 222a identifies first post generating data 31a with use of the appliance ID. Then, the posting execution section 222a reads out the first post generating data 31a thus identified, and set the first post generating data 31a as posting data (first message). On the other hand, in a case where the posting execution section 222a has obtained a determination result indicating that the house-sitting setting is "OFF" and an appliance ID identified by the setting determination section 221, the posting execution section 222a identifies second post generating data 31a with use of the appliance ID. Then, the posting execution section 222a reads out the second post generating data 31a thus identified, and set the second post generating data 31a as posting data (second message). Then, the posting execution section 222a transmits the posting data to the family message board server 2 via the communication section 11.

(Flow of Processes Executed by the Agent Server 1a)

The following description will discuss a flow of processes executed by the agent server 1a, with reference to FIG. 9. FIG. 9 is a flowchart showing an example of a flow of processes executed by the agent server 1a. Note that steps S11 through S15 in FIG. 9 are similar to the respective steps S1 through S5 in the flowchart shown in FIG. 6 described in Embodiment 1, and therefore descriptions of the steps S11 through S15 are omitted here.

In a case where information (which is stored in the column of "trigger" in the setting management database 32 shown in FIG. 5) associated with the appliance ID received together with the state charge information conforms to the received state change information (YES in S15), the setting determination section 221 identifies a house-sitting setting of the household appliance whose state change information has been transmitted S16). Specifically, the setting determination section 221 refers to the setting management database 32 and determines whether the house-sitting setting associated with the received appliance ID is "ON" or "OFF". Then, the setting determination section 221 outputs the determination result and the received appliance ID to the posting execution section 222a.

Subsequently, the posting execution section 222a generates posting data in accordance with the house-sitting setting identified by the setting determination section 221, and transmits the posting data to the family message board server (S17). Specifically, in a case where the determination result indicates that the house-sitting setting is "ON", the posting execution section 222a reads out first post generating data 31a from the post generating data 31a that is associated with the received appliance ID. On the other hand, in a case where the determination result indicates that the house-sitting setting is "OFF", the posting execution section 222a reads out second post generating data 31a. Then, the posting execution section 222a transmits, as the posting data, the post generating data 31a which has been read out to the family message board server 2.

In a case where the determination result by the setting determination section 221 indicates that the house-sitting setting of the household appliance 4 whose state change information has been transmitted is "ON" (YES in S18), the setting determination section 221 outputs the determination result and the received appliance ID to the setting management section 21. The setting management section 21 sets, in the setting management database 32, house-sitting settings of the household appliance 4 whose state change information has been transmitted and of a household appliance whose ID is identical with that of the household appliance 4 to "OFF" based on the received determination result and appliance ID (S19). On the other hand, in a case where the determination result indicates that the house-sitting setting of the household appliance 4 whose state change information has been transmitted is "OFF" (NO in S18), the setting determination section 221 ends the process.

Note that the process of the step S18 is actually carried out in the step S16. That is, in a case where the determination result indicates that the house-sitting setting of the household appliance 4 whose state change information has been transmitted is "ON", the setting determination section 221 outputs, to the posting execution section 222a and the setting management section 21, the determination result and the appliance ID of the household appliance 4 whose state change information has been transmitted. Therefore, the process of the step S19 can be carried out before the step S17 or can be carried out concurrently with the process of the step S17.

Embodiment 3

Figure 10:
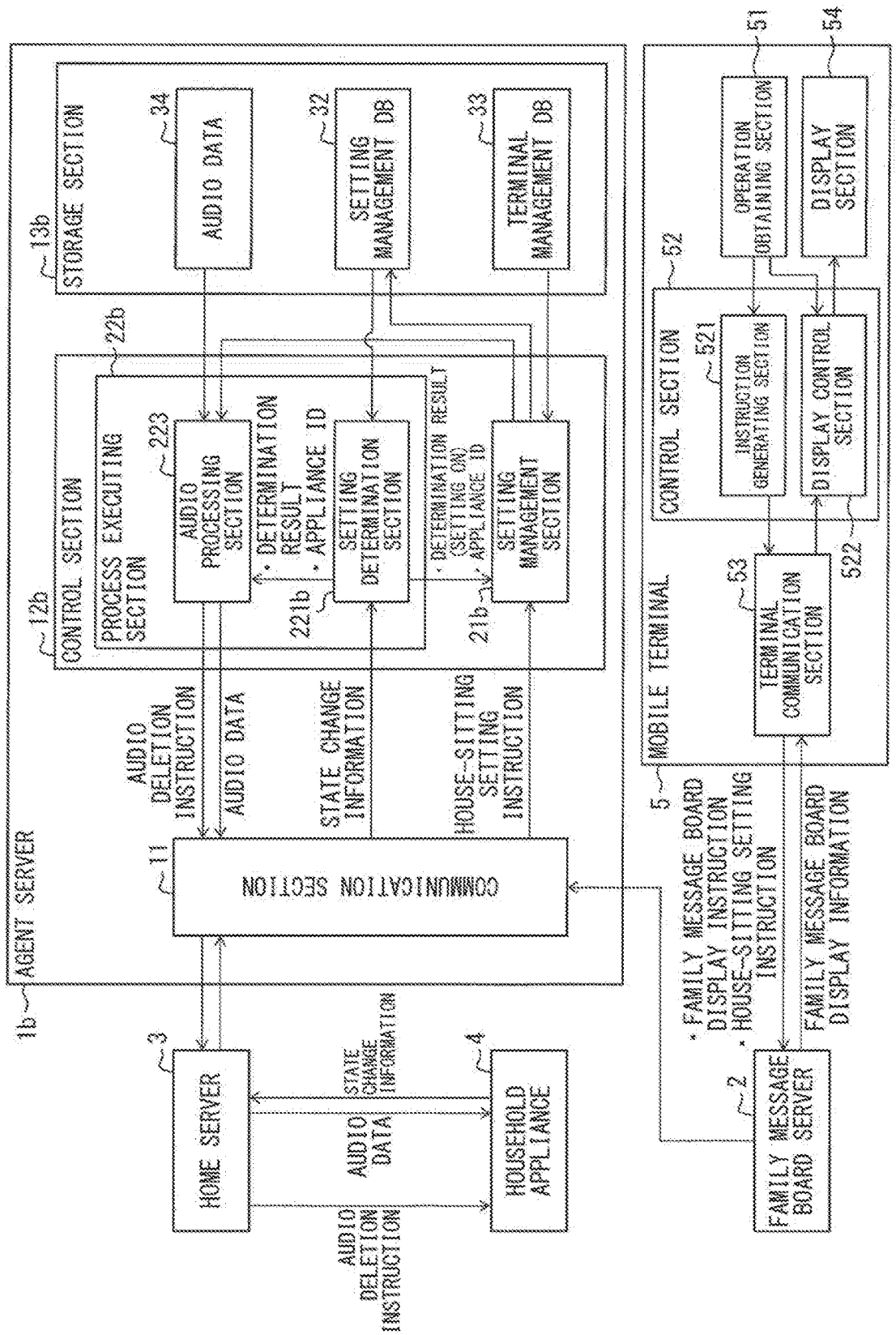
FIG. 10 is a block diagram illustrating main configurations of an agent server and a mobile terminal in accordance with Embodiment 3 of the present invention.
Figure 11:
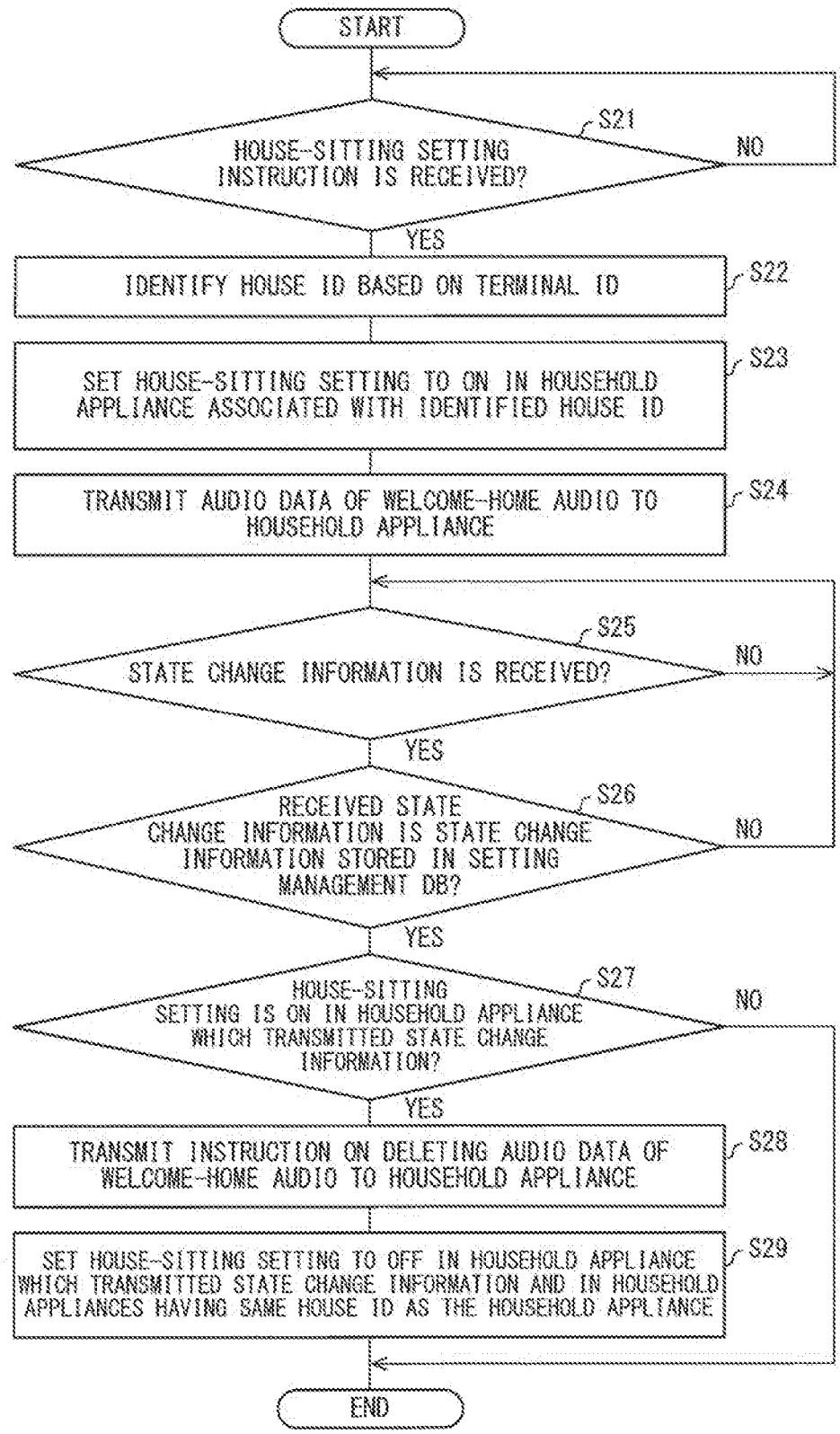
FIG. 11 is a flowchart showing a flow of processes executed by the agent server illustrated in FIG. 10.

The following description will discuss another embodiment (Embodiment 3) of the present invention with reference to FIGS. 10 and 11. Note that, for convenience of explanation, members identical in function to those described in the above Embodiment 1 are given identical reference numerals, and descriptions of those members are omitted.

In a case where an agent server 1b in accordance with Embodiment 3 has received a house-sitting setting instruction, the agent server 1b transmits predetermined audio data (first audio data, hereinafter referred to as "welcome-home audio data") to a household appliance 4, unlike the agent server 1 described in Embodiment 1. Then, in a case where the agent server 1b has received predetermined state change information (in Embodiment 3, information indicating a change in state for which audio output by the welcome-home audio data is executed) from the household appliance 4, the agent server 1b transmits an instruction on deleting the welcome-home audio data to the household appliance 4.

(Agent Server 1b)

The following description will discuss details of a configuration of the agent server 1b in accordance with Embodiment 3, with reference to FIG. 10. FIG. 10 is a block diagram illustrating an example of main configurations of the agent server 1b and the mobile terminal 5. Note that details of the mobile terminal 5 have already been described in Embodiment 1, and are therefore not described here.

As illustrated in FIG. 10, the agent server 1b includes (i) a control section 12b instead of the control section 12 and (ii) a storage section 13b instead of the storage section 13, as compared with the agent server 1 in accordance with Embodiment 1.

In Embodiment 3, the control section 12b includes (i) a setting management section 21b instead of the setting management section 21 and (ii) a process executing section 22b instead of the process executing section 22, as compared with the control section 12 in accordance with Embodiment 1. Moreover, the storage section 13b stores audio data 34 instead of the post generating data 31, as compared with the storage section 13 in accordance with Embodiment 1.

The audio data 34 is data used for the household appliance 4 to output audio, and includes the above described welcome-home audio data. In Embodiment 3, the welcome-home audio data is described as being the same among all household appliances 4. Note, however, that contents of audio or ends of words of audio can vary depending on the household appliances 4. In the latter case, each piece of welcome-home audio data is stored so as to be associated with an appliance ID.

Note that details of the setting management database 32 in accordance with Embodiment 3 are similar to those of the setting management database 32 shown in FIG. 5, and are therefore not described here. Note, however, that pieces of state change information stored in the column of "trigger" are all pieces of information each of which indicates a change in state for which output of audio by the welcome-home audio data is to be executed. For example, the refrigerator 4b whose appliance ID in FIG. 5 is "A0001" outputs audio based on welcome-home audio data in a case where a change in state has occurred in which a door has opened in a state in which the welcome-home audio data had been received.

The setting management section 21b has a function to output, to an audio processing section 223 (described later), an appliance ID of a household appliance 4 whose house-sitting setting has been set to "ON" in the setting management database 32, in addition to the functions of the setting management section 21 described in Embodiment 1.

The process executing section 22b includes (i) a setting determination section 221b instead of the setting determination section 221 and (ii) an audio processing section 223 instead of the posting execution section 222, as compared with the process executing section 22 in accordance with Embodiment 1.

The setting determination section 221b has a function in addition to the functions of the setting determination section 221 described in Embodiment 1. That is, in a case where the setting determination section 221b has determined that a house-sitting setting which is associated with an appliance ID of a household appliance 4 whose state change information has been transmitted is "ON", the setting determination section 221b reads out, from the setting management database 32, all appliance IDs which are associated with a house ID with which the identified appliance ID is also associated, and outputs those appliance IDs together with the determination result to the audio processing section 223.

The audio processing section 223 transmits welcome-home audio data to the household appliance 4 whose house-sitting setting has been set to "ON". Specifically, in a case where the audio processing section 223 has received the appliance ID from the setting management section 21b, the audio processing section 223 reads out welcome-home audio data from the storage section 13b and transmits the welcome-home audio data to the household appliance 4.

Moreover, in a case where the audio processing section 223 has received, from the setting determination section 221, the determination result indicating that the house-sitting setting is "ON" and the appliance IDs, the audio processing section 223 transmits an instruction on deleting welcome-home audio (hereinafter, referred to as "audio deletion instruction") to all household appliances 4 indicated by the respective appliance IDs. On the other hand, in a case here the audio processing section 223 has received a determination result which indicates that the house-sitting setting is "OFF", the audio processing section 223 ends the process without transmitting an audio deletion instruction.

(Flow of Processes Executed by the Agent Server 1b)

The following description will discuss a flow of processes executed by the agent server 1b, with reference to FIG. 11. FIG. 11 is a flowchart showing an example of a flow of processes executed by the agent server 1b. Note that steps S21 through S23, S25 through S27, and S29 in FIG. 11 are similar to the respective steps S1 through S3, S4 through S6, and S8 in the flowchart shown in FIG. 6 described in Embodiment 1, and therefore descriptions of the steps S21 through S23, S25 through S27, and S29 are omitted here.

The setting management section 21b outputs, to the audio processing section 223, an appliance ID of a household appliance 4 whose house-sitting setting has been set to "ON". Then, the audio processing section 223 transmits audio data of welcome-home audio to the household appliance 4 which is indicated by the received appliance ID (S24).

In a case where a house-sitting setting of a household appliance 4 whose state change information has been transmitted is "ON" (YES in S27), the setting determination section 221b reads out, from the setting management database 32, all appliance IDs which are associated with a house ID with which the identified appliance ID is also associated. Then, the setting determination section 221b outputs those appliance IDs together with the determination result to the audio processing section 223. Then, the audio processing section 223 transmits an instruction on deleting audio data of welcome-home audio (audio deletion instruction) to the household appliances 4 which are indicated bar the received appliance IDs (S28).

As such, the agent server 1b in accordance with Embodiment 3 transmits welcome-home audio data to the household appliance 4 whose house-sitting setting has been set to "ON". According to the configuration, the welcome-home audio is to be outputted in a case where the user has returned home and carried out a predetermined operation with respect to the household appliance 4. Therefore, it is possible to achieve more realistic communications between the user and the household appliance 4.

Embodiment 4

Figure 12:
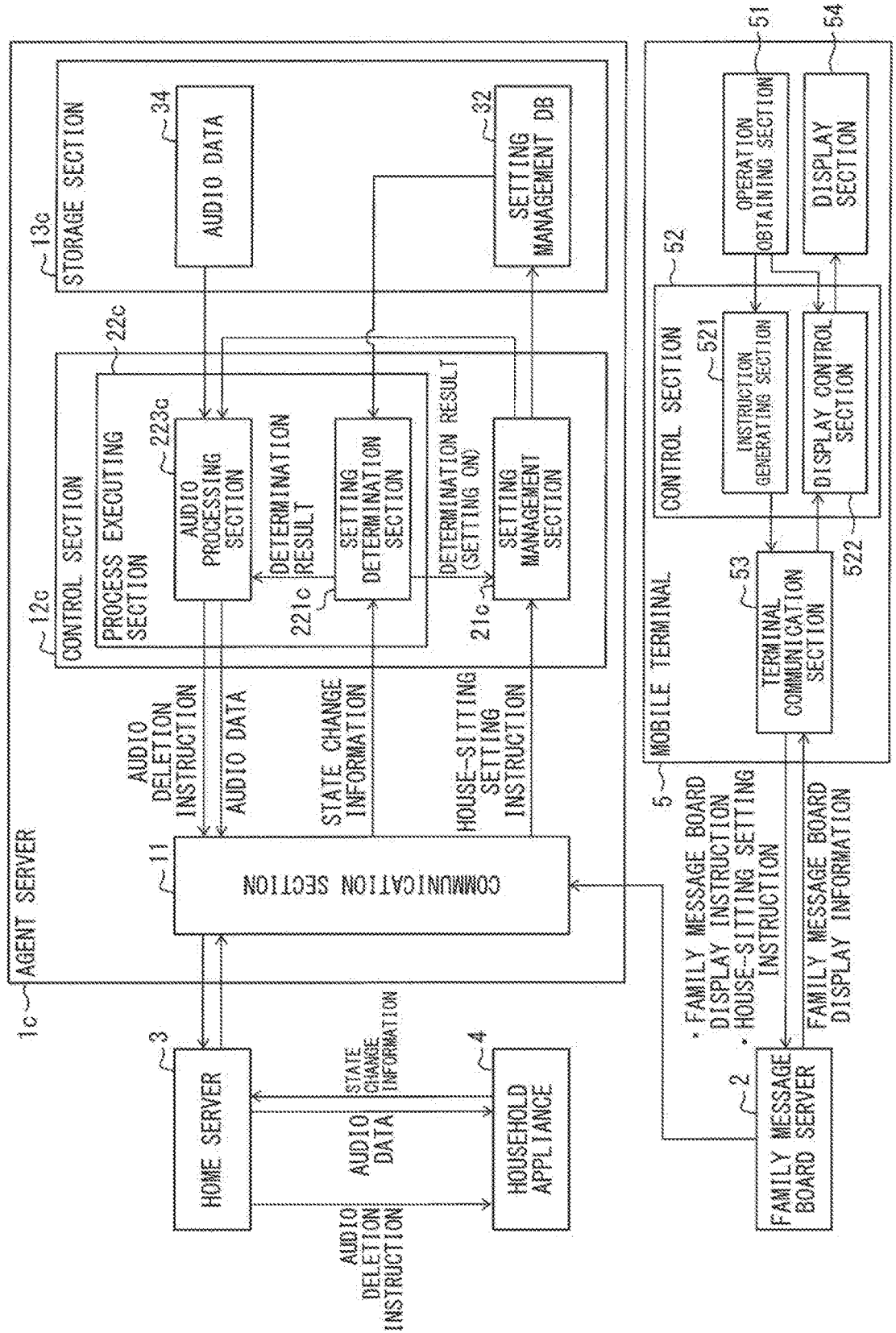
FIG. 12 is a block diagram illustrating main configurations of an agent server and a mobile terminal in accordance with Embodiment 4 of the present invention.
Figure 13:
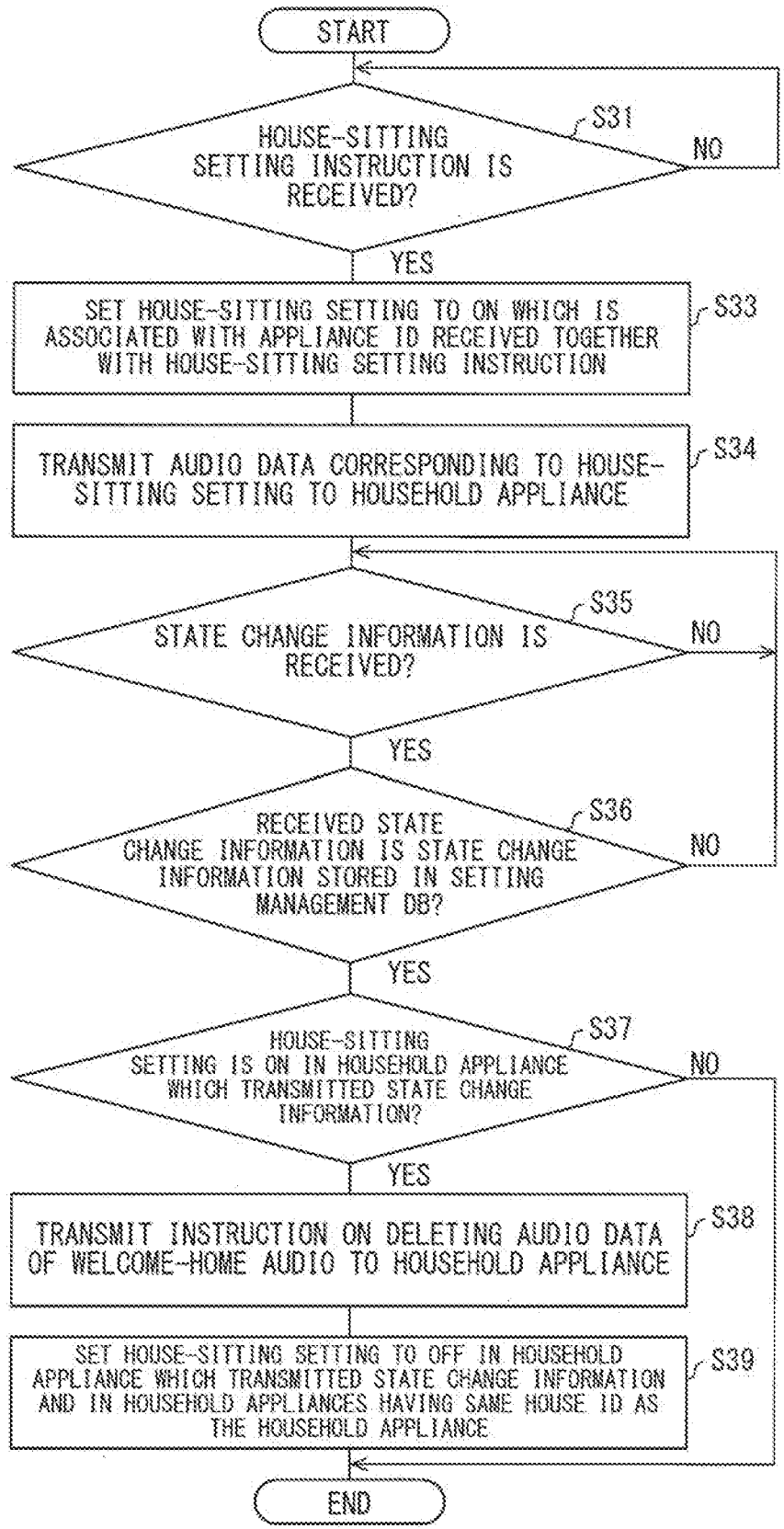
FIG. 13 is a flowchart showing a flow of processes executed by the agent server illustrated in FIG. 12.

The following description will discuss another embodiment (Embodiment 4) of the present invention with reference to FIGS. 12 and 13. Note that, for convenience of explanation, members identical in function to those described in the above Embodiment 1 are given identical reference numerals, and descriptions of those members are omitted.

An agent server 1c in accordance with Embodiment 4 transmits audio data even to a household appliance 4 whose house-sitting setting has been set to "OFF". Note, however, that the agent server 1c transmits, to the household appliance 4 whose house-sitting setting is "OFF", audio data (second audio data) which is different from the welcome-home audio described in Embodiment 3.

Note that, in Embodiment 4, a case will be described in which it is possible to select, with use of the mobile terminal 5, a household appliance 4 whose house-sitting setting is to be set to "ON" and a household appliance 4 whose house-sitting setting is to be kept "OFF". That is, from the mobile terminal 5, an appliance ID of a household appliance 4 whose house-sitting setting is to be set to "ON" is transmitted to the agent server 1c together with a house-sitting setting instruction.

(Agent Server 1c)

The following description will discuss details of a configuration of the agent server 1c in accordance with Embodiment 4, with reference to FIG. 12. FIG. 12 is a block diagram illustrating an example of main configurations of the agent server 1c and the mobile terminal 5. Note that details of the mobile terminal 5 have already been described in Embodiment 1, and are therefore not described here.

As illustrated in FIG. 12, the agent server 1c includes (i) a control section 12c instead of the control section 12 and (ii) a storage section 13c instead of the storage section 13, as compared with the agent server 1 in accordance with Embodiment 1.

In Embodiment 4, the control section 12c includes (i) a setting management section 21c instead of the setting management section 21 and (ii) a process executing section 22c instead of the process executing section 22, as compared with the control section 12 in accordance with Embodiment 1. Moreover, the storage section 13c stores audio data 34 instead of the post generating data 31, as compared with the storage section 13 in accordance with Embodiment 1. Moreover, the storage section 13c does not store the terminal management database 33 described in Embodiment 1. Note that details of the audio data 34 have already been described in Embodiment 3, and are therefore not described here.

Unlike the setting management section 21 described in Embodiment 1, in a case where the setting management section 21c has received a house-sitting setting instruction, the setting management section 21c refers to the setting management database 32 and identifies an appliance ID which conforms to an appliance ID that has been transmitted from the mobile terminal 5 together with the house-sitting setting instruction. Then, the setting management section 21c sets a house-sitting setting of the identified appliance ID to "ON". Then, the setting management section 21c distinguishes an appliance ID of a household appliance 4 whose house-sitting setting has been set to "ON" from an appliance ID of a household appliance 4 which is associated with the same house ID with that appliance ID and whose house-sitting setting remains "OFF", and outputs the appliance IDs thus distinguished to an audio processing section 223c.

The process executing section 22c includes (i) a setting determination section 221c instead of the setting determination section 221 and (ii) an audio processing section 223c instead of the posting execution section 222, as compared with the process executing section 22 in accordance with Embodiment 1.

The setting determination section 221c has the following function in addition to the functions of the setting determination section 221 described in Embodiment 1. That is, in a case where the setting determination section 221c has determined that a house-sitting setting which is associated with an appliance ID of a household appliance 1 whose state change information has been transmitted is "ON", the setting determination section 221c reads out, from the setting management database 32, all appliance IDs associated with the house-sitting setting of "ON" among appliance IDs which are associated with a house ID with which the identified appliance ID is also associated, and outputs those read-out appliance IDs together with the determination result to the audio processing section 223c.

Unlike the audio processing section 223 described in Embodiment 3, the audio processing section 223c transmits welcome-home audio data to the household appliance 4 whose house-sitting setting has been set to "ON". Moreover, the audio processing section 223c transmits audio data (second audio data) which is different from the welcome-home audio data to the household appliance 4 whose house-sitting setting remains "OFF". Note that a content of the second audio data is not particularly limited, provided that the content is different from that of the welcome-home audio data. For example, the second audio data can be audio data for outputting audio of "How are you doing?".

(Flow of Processes Executed by the Agent Server 1c)

The following description will discuss a flow of processes executed by the agent server 1c, with reference to FIG. 13. FIG. 13 is a flowchart showing an example of a flow of processes executed by the agent server 1c. Note that steps S31, S34 through S36, and S38 in FIG. 13 are similar to the respective steps S1, S4 through S6, and S8 in the flowchart shown in FIG. 6, and therefore descriptions of the steps S31, S34 through S36, and S38 are omitted here.

In a case where the setting management section 21c has received a house-sitting setting instruction (YES in S31), the setting management section 21c refers to the setting management database 32 and sets a house-sitting setting to "ON", which is associated with an appliance ID that conforms to an appliance ID that has been received together with the house-sitting setting instruction (S32). Then, the setting management section 21c distinguishes an appliance ID of a household appliance 4 whose house-sitting setting has been set to "ON" from an appliance ID of a household appliance 4 which is associated with the same house ID with that appliance ID and whose house-sitting setting remains "OFF", and outputs the appliance IDs thus distinguished to an audio processing section 223c.

Subsequently, the audio processing section 223c transmits, to the household appliance 4, audio data in accordance with the house-sitting setting (S33). Specifically, the audio processing section 223c (i) transmits welcome-home audio data to the household appliance 4 whose house-sitting setting has been set to "ON" and (ii) transmits, to the household appliance 4 whose house-sitting setting remains "OFF", audio data which is different from the welcome-home audio data.

In a case where a house-sitting setting of a household appliance 4 whose state change information has been transmitted is "ON" (YES in S37), the setting determination section 221c reads out, from the setting management database 32, all appliance IDs associated with the house-sitting setting of "ON" among appliance IDs which are associated with a house ID with which the identified appliance ID is also associated, and outputs those read-out appliance IDs together with the determination result to the audio processing section 223c. Then, the audio processing section 223c transmits an instruction on deleting audio data of welcome-home audio (audio deletion instruction) to the household appliances 4 which are indicated by the received appliance IDs (S37).

As above described, the agent server 1c in accordance with Embodiment 4 transmits welcome-home audio data to the household appliance 4 whose house-sitting setting has been set to "ON". Moreover, the agent server 1c transmits, to the household appliance 4 whose house-sitting setting remains "OFF", audio data which is different from the welcome-home audio data. As such, it is possible to change contents of audio to be outputted, depending on household appliances 4.

Note that the configurations described in Embodiment 4 and Embodiment 3 are applicable to Embodiments 1 and 2.

In a case where the agent server 1c in accordance with Embodiment 4 has received a house-sitting setting cancelling instruction, the agent server 1c can (i) set a house-sitting setting associated with an appliance ID received together with the instruction to "OFF" and (ii) transmit second audio data to a household appliance 4 whose house-sitting setting has been set to "OFF". Note that the household appliance 4 which has received the second audio data preferably deletes the welcome-home audio data which had already been received.

In Embodiments 1 through 4 above, the example has been described in which the state change information which serves as a trigger of transmitting posting data and of audio deletion instruction is information (e.g., information indicating that the door of the refrigerator 4b has opened) which indicates that the user has operated the household appliance 4 without using the agent server 1 (or any of the agent servers 1a through 1c). Note, however, that the state change information which serves as the trigger is not limited to such information. For example, information obtained by a sensor included in the household appliance 4 can serve as a trigger. This example will be described with reference to a configuration in which the air conditioner 4c transmits, to the agent server information indicating that the air conditioner 4c has detected that a room temperature has become equal to or higher than a predetermined temperature, and the agent server 1 transmits predetermined posting data to the family message board server 2. In a case where the house-sitting setting is "ON", the agent server 1 transmits, to the family message board server 2, posting data having a content of "The room is hot. Would you like to cool it before you come home?". On the other hand, in a case where the house-sitting setting is "OFF", the agent server 1 transmits, to the family message board server 2, posting data having a content of "The room is hot. Would you like to turn ON the air-conditioner for preventing heatstroke?".

Furthermore, the state change information which serves as a trigger of transmitting posting data and of audio deletion instruction can be information with which the agent server 1 can determines that the user is in a state in which the user can operate the control target device without using the agent server 1. For example, the information can be information which indicates that the user has returned home.

In Embodiments 3 and 4 above, the example has been described in which the setting management section 21b or the setting management section 21c transmits welcome-home audio data in a case where the house-sitting setting is set to "ON". Note, however, that Embodiments 3 and 4 above are not limited to the configuration in which audio data is transmitted when the house-sitting setting is changed. For example, it is possible to employ a configuration in which welcome-home audio data has been transmitted to a household appliance 4 in advance, and an instruction on allowing or inhibiting an output of welcome-home audio is transmitted to the household appliance 4 when the house-sitting setting is changed. Alternatively, it is possible to employ a configuration in which an instruction is given such that the household appliance 4 most preferentially outputs welcome-home audio data, which has been transmitted to the household appliance 4 in advance, when the house-sitting setting is set to "ON".

Embodiment 5

Figure 14:
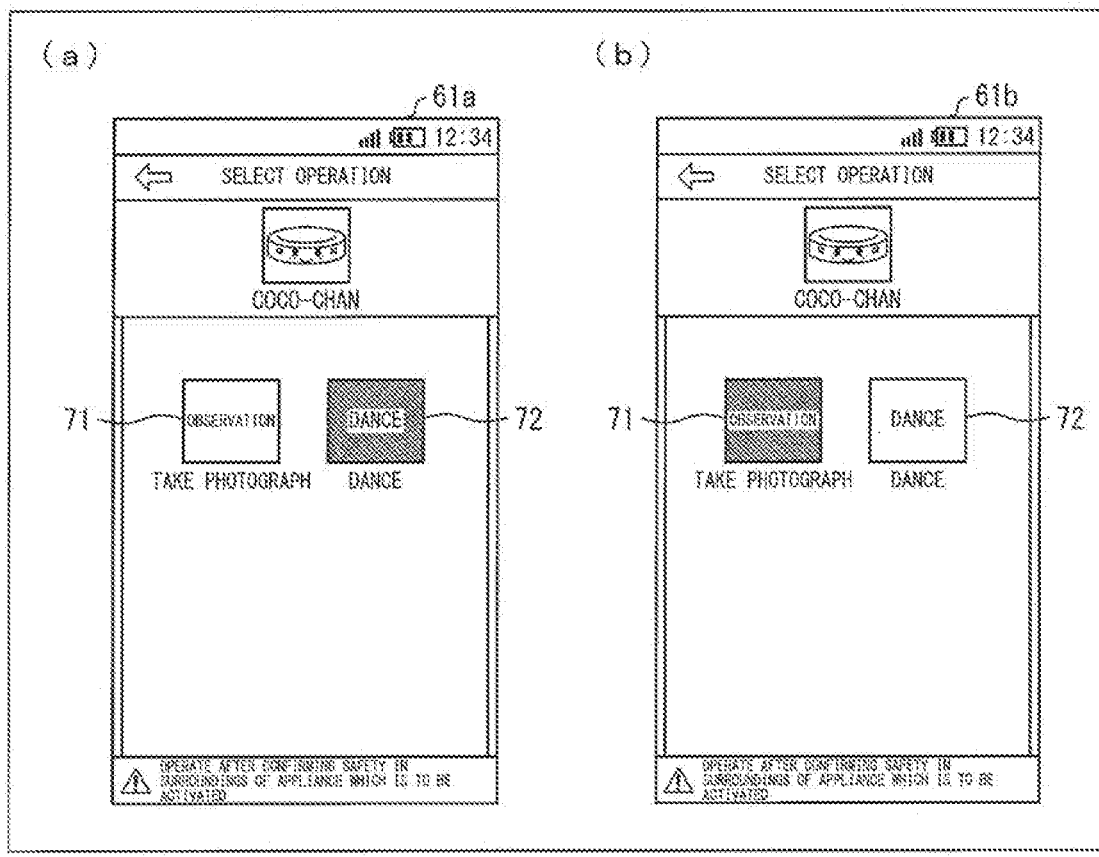
FIG. 14 illustrates a screen displayed on a mobile terminal in accordance with Embodiment 5 of the present invention. (a) of FIG. 14 illustrates a screen displayed in a case where a house-sitting setting of a household appliance is ON, and (b) of FIG. 14 illustrates a screen displayed in a case where the house-sitting setting is OFF.
Figure 15:
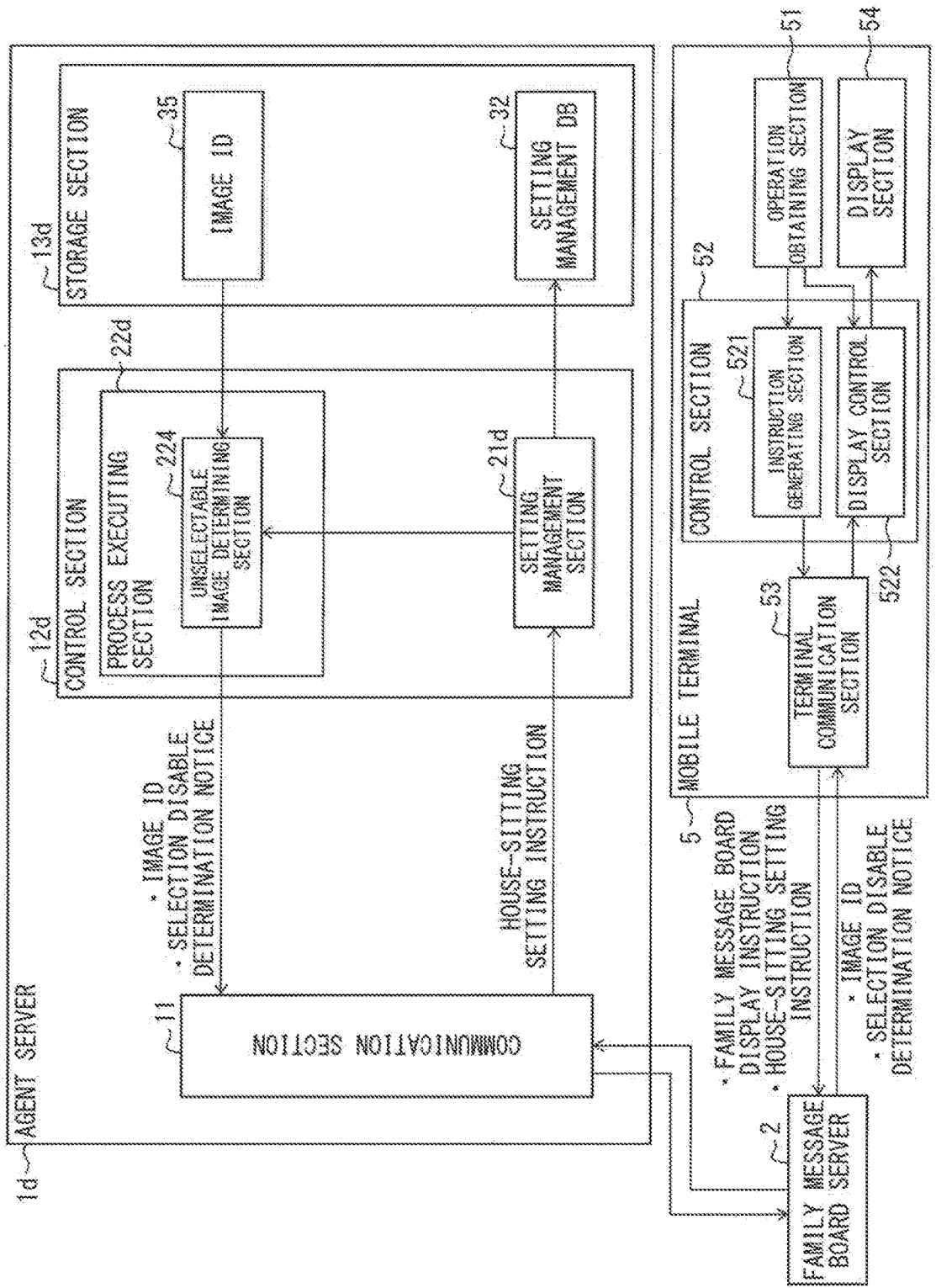
FIG. 15 is a block diagram illustrating main configurations of an agent server and a mobile terminal in accordance with Embodiment 5 of the present invention.
Figure 16:
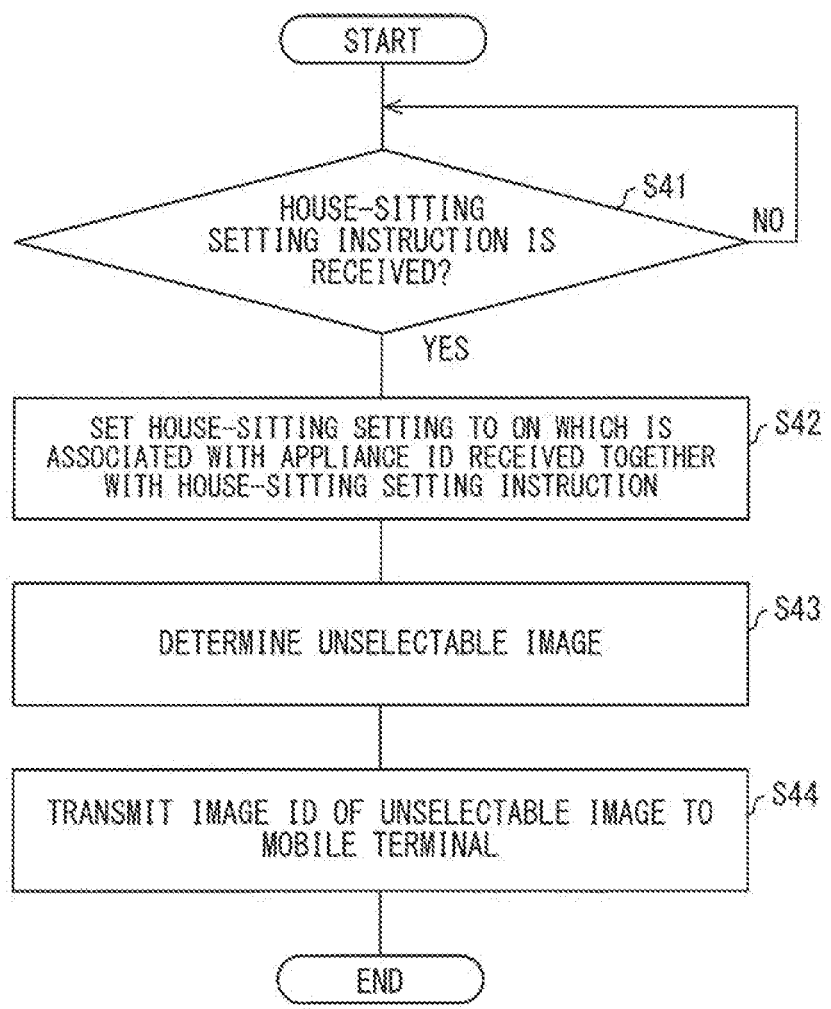
FIG. 16 is a flowchart showing a flow of processes executed by the agent server illustrated in FIG. 15.

The following description will discuss another embodiment (Embodiment 5) of the present invention with reference to FIGS. 14 through 16. Note that, for convenience of explanation, members identical in function to those described in the above Embodiment 1 are given identical reference numerals, and descriptions of those members are omitted.

Unlike the agent server 1 described in Embodiment 1, an agent server 1d in accordance with Embodiment 5 determines a seal image which cannot be selected in the mobile terminal 5 depending on whether a house-sitting setting of a household appliance 4 is "ON" or "OFF", and notifies the mobile terminal 5 of the determination result. Note that, in Embodiment 5, a case will be described in which it is possible to select, with use of the mobile terminal 5, a household appliance 4 whose house-sitting setting is to be set to "ON" and a household appliance 4 whose house-sitting setting remains "OFF", as with Embodiment 4 described above.

(Overview of Embodiment 5)

Here, the following description will discuss an overview of Embodiment 5 with reference to FIG. 14. FIG. 14 illustrates a screen displayed on a mobile terminal 5 in accordance with Embodiment 5.

(a) of FIG. 14 illustrates a selection screen 61a displayed in a case where a house-sitting setting of a household appliance 4 (robot cleaner 4a) is set to "ON" by a user with use of the mobile terminal 5. As illustrated in (a) of FIG. 14, the selection screen 61a displays a seal image that shows "OBSERVATION" for giving an instruction (execution instruction) on causing the robot cleaner 4a to take a photograph of surroundings and to transmit the photograph to the mobile terminal 5. Moreover, the selection screen 61a displays a seal image 72 that shows "DANCE" for giving an instruction on causing the robot cleaner 4a to dance. Here, in a case where the house-sitting setting of the robot cleaner 4a is "ON", the agent server 1d determines that the seal image 72 as a seal image which cannot be selected (hereinafter, referred to as "unselectable image"), and notifies the mobile terminal 5 of the determination result. From this, the mobile terminal 5 displays the seal image 72 as an unselectable image (in the example illustrated in FIG. 14, the seal image is grayed so as to indicate that the seal image is an unselectable image) so as not to receive an operation by the user to select the seal image 72. This is because the user is not near the robot cleaner 4a (e.g., the user is out) and therefore it is not necessary to cause the robot cleaner 4a to dance.

Meanwhile, (b) of FIG. 14 illustrates a selection screen 61b displayed in a case where the house-sitting setting of the household appliance 4 (robot cleaner 4a) is set to "OFF" by the user with use of the mobile terminal 5. Here, in a case where the house-sitting setting of the robot cleaner 4a is "OFF", the agent server 1d determines that the seal image 71 as an unselectable image, and notifies the mobile terminal 5 of the determination result. From this, the mobile terminal 5 displays the seal image 71 as an unselectable image so as not to receive an operation by the user to select the seal image 71. This is because the user is at home and therefore it is not necessary to cause the robot cleaner 4a to take a photograph of the surroundings.

As such, the agent server 1d in accordance with Embodiment 5 determines a seal image which cannot be selected in the mobile terminal 5 depending on whether a house-sitting setting of a household appliance 4 is "ON" or "OFF". This makes it possible to present a seal image which corresponds to whether the user is in a state in which the user cannot operate the household appliance 4 without using the agent server 1d or is in a state in which the user can operate the household appliance 4 without using the agent server 1d. It is therefore possible to prevent the user from selecting a seal image which is low in necessity (i.e., which does not suit a state of the user by mistake.

(Agent Server 1d)

The following description will discuss details of a configuration of the agent server 1d in accordance with Embodiment 5, with reference to FIG. 15. FIG. 15 is a block diagram illustrating an example of main configurations of the agent server 1d and the mobile terminal 5. Note that descriptions of the mobile terminal 5 are omitted here. This is because the mobile terminal 5 of Embodiment 5 is similar to that described in Embodiment 1, except that the display control section 522 changes, based on a selection disable determination notice indicating an unselectable image, display of a seal image (i.e., the unselectable image is grayed) which is indicated by an image ID transmitted from the agent server 1d together with the selection disable determination notice. Moreover, the home server 3 and the household appliances 4 are not illustrated in FIG. 15 because those are less relevant to the configuration of Embodiment 5.

As illustrated in FIG. 15, the agent server 1d includes (i) a control section 12d instead of the control section 12 and (ii) a storage section 13d instead of the storage section 13, as compared with the agent server 1 in accordance with Embodiment 1.

In Embodiment 5, the control section 12d includes (i) a setting management section 21d instead of the setting management section 21 and (ii) a process executing section 22d instead of the process executing section 22, as compared with the control section 12 in accordance with Embodiment 1. Moreover, the storage section 13d stores an image ID 35 instead of the post generating data 31, as compared with the storage section 13 in accordance with Embodiment 1. Moreover, the storage section 13d does not store the terminal management database 33 described in Embodiment 1.

The image ID 35 is information for identifying the above described seal image. The image ID 35 is associated with an appliance ID of a household appliance 4 which is an instruction target, and unselectable image determining information (which is similar to a flag of a house-sitting setting stored in the setting management database 32, i.e., "ON" or "OFF") for determining an unselectable image. That is, an image ID 35 which is associated with "ON" indicates an image which becomes an unselectable image in a case where a house-sitting setting of the image is "ON".

The setting management section 21d distinguishes an appliance ID of a household appliance 4 whose house-sitting setting has been set to "ON" from an appliance ID of a household appliance 4 which is associated with the same house ID with that appliance ID and whose house-sitting setting remains "OFF", and outputs the appliance IDs thus distinguished to an unselectable image determining section 224 (described later). The other functions are identical with those of the setting management section 21c described in Embodiment 4.

The process executing section 22d does not include the setting determination section 221, as compared with the process executing section 22 in accordance with Embodiment 1. Moreover, the process executing section 22d includes an unselectable image determining section 224 instead of the posting execution section 222.

The unselectable image determining section 224 determines an unselectable image from among seal images for a household appliance 4 (i.e., instruction target) depending on whether a house-sitting setting of the household appliance 4 is "ON" or "OFF". Specifically, in a case where the unselectable image determining section 224 has received appliance IDs from the setting management section 21d, the unselectable image determining section 224 identifies image IDs 35 which are associated with appliance IDs of household appliances 4 whose house-sitting setting has been set to "ON". Then, among the identified image IDs 35, the unselectable image determining section 224 further identifies an image ID which is associated with unselectable image determining information of "ON". Then, the unselectable image determining section 224 transmits the identified image ID to the mobile terminal 5 together with a selection disable determination notice.

(Flow of Processes Executed by the Agent Server 1D)

The following description will discuss a flow of processes executed by the agent server 1d, with reference to FIG. 16. FIG. 16 is a flowchart showing an example of a flow of processes executed by the agent server 1d. Note that steps S41 and S42 in FIG. 16 are similar to the respective steps S31 and S32 in the flowchart shown in FIG. 13, and therefore descriptions of the steps S41 and S42 are omitted here. In the flowchart shown in FIG. 16, an example is described in which a house-sitting setting instruction has been received in a state in which, in the setting management database 32, house-sitting settings of all household appliances 4 which are associated with the same house ID are "OFF".

The setting management section 21d distinguishes an appliance ID of a household appliance 4 whose house-sitting setting has been set to "ON" from an appliance ID of a household appliance 4 which is associated with the same house ID with that appliance ID and whose house-sitting setting remains "OFF", and outputs the appliance IDs thus distinguished to the unselectable image determining section 224.

Subsequently, the unselectable image determining section 224 determines an unselectable image (S43). Specifically, in a case where the unselectable image determining section 224 has received appliance IDs from the setting management section 21b, the unselectable image determining section 224 identifies image IDs 35 which are associated with appliance IDs of household appliances 4 whose house-sitting setting has been set to "ON". Then, among the identified image IDs 35, the unselectable image determining section 224 further identifies an image ID which is associated with unselectable image determining information of "ON". Subsequently, the unselectable image determining section 224 transmits the image ID of the unselectable image to the mobile terminal 5 (S44). Specifically, the unselectable image determining section 224 transmits, to the mobile terminal 5, the image ID which has been identified in the step S43 and is associated with unselectable image determining information of "ON".

Note that the configurations described in Embodiment 5 are applicable to Embodiments 1 through 4. In a case where the agent server 1*d* in accordance with Embodiment 5 has received a house-sitting setting cancelling instruction, the agent server 1*d* sets a house-sitting setting associated with an appliance ID received together with the instruction to "OFF". Then, among image IDs of seal images for the household appliance 4 (i.e., instruction target) indicated by the appliance ID, the agent server 1*d* identifies an image ID associated with unselectable image determining information of "OFF", and the agent server 1*d* transmits the identified image ID to the mobile terminal 5 together with a selection disable determination notice.

Moreover, the agent server 1*d* merely needs to be capable of causing the mobile terminal 5 to display seal images, which can be executed depending on whether the house-sitting setting is "ON" or "OFF", such that the seal images can be selected. For example, the agent server 1 can announce selectable seal images, instead of unselectable images. Further, it is possible to employ a configuration in which the agent server 1*d* manages seal images and transmits only selectable seal images to the mobile terminal 5 so that the selectable seal images are displayed.

Embodiment 6

Figure 17:
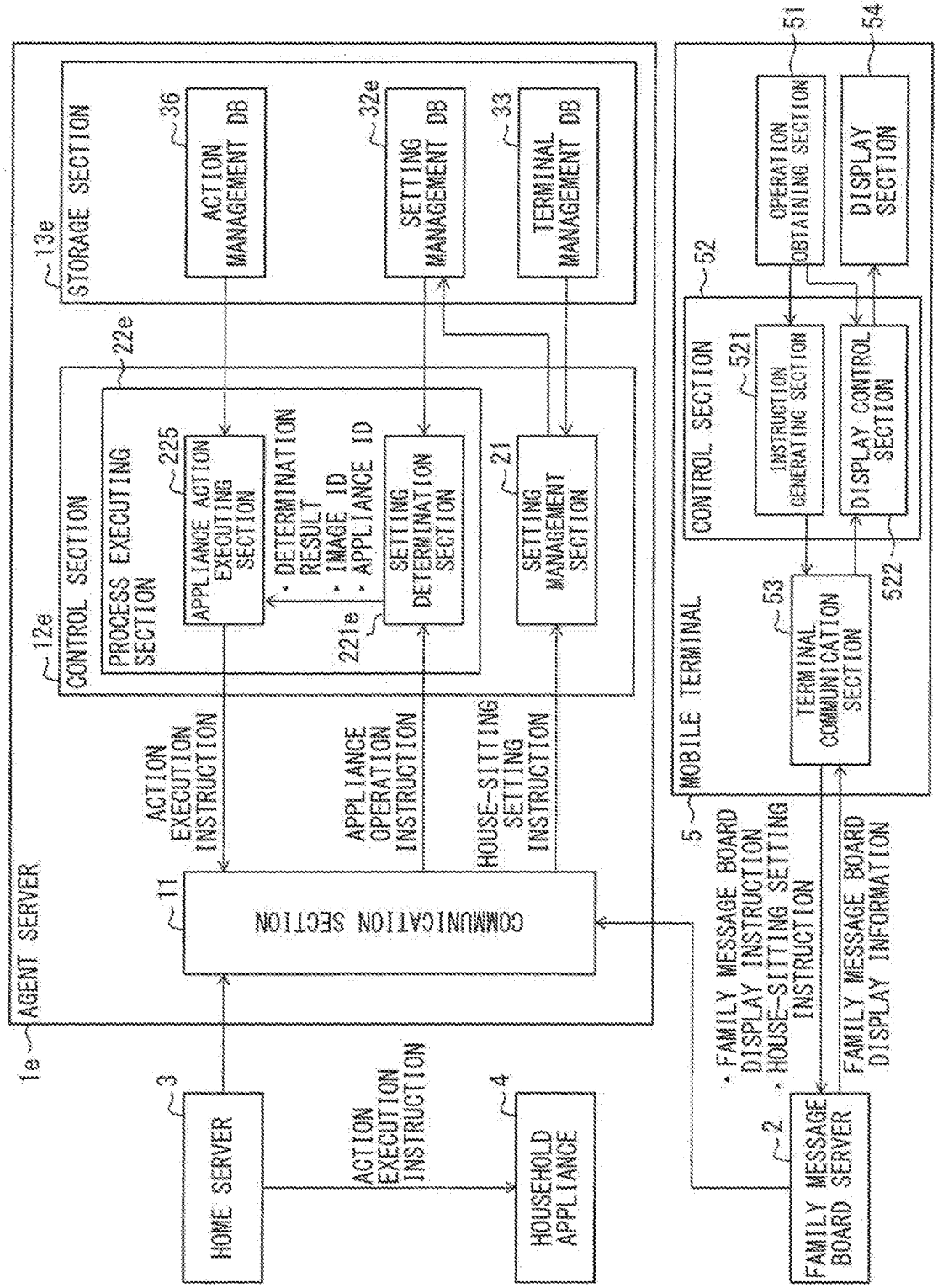
FIG. 17 is a block diagram illustrating main configurations of an agent server and a mobile terminal in accordance with Embodiment 6 of the present invention.
Figure 19:
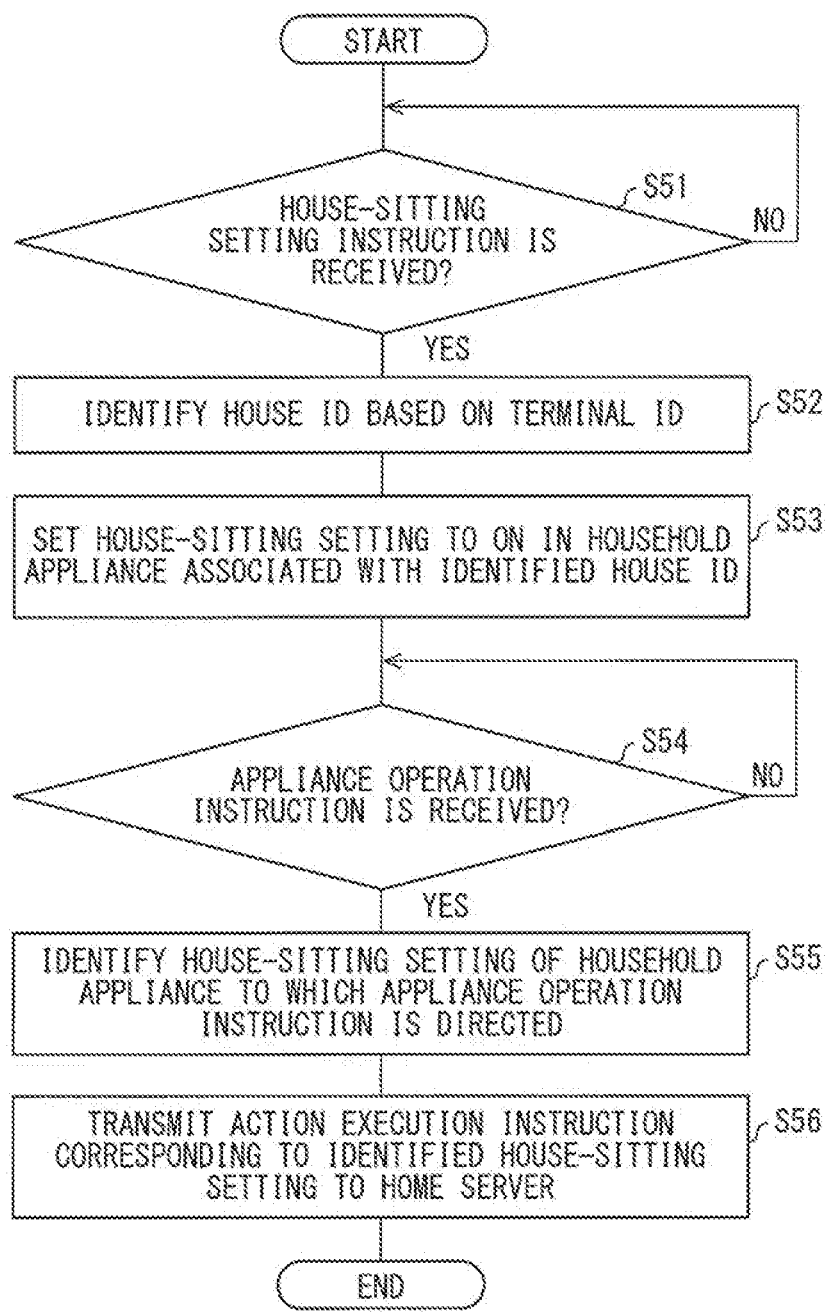
FIG. 19 is a flowchart showing a flow of processes executed by the agent server illustrated in FIG. 17.

The following description will discuss another embodiment (Embodiment 6) of the present invention with reference to FIGS. 17 through 19. Note that, for convenience of explanation, members identical in function to those described in the above Embodiment 1 are given identical reference numerals, and descriptions of those members are omitted.

Unlike the agent server 1 described in Embodiment 1, in a case where an agent server 1*e* in accordance with Embodiment 6 has received an appliance operating instruction (i.e., an instruction which is transmitted to the agent server 1*e* in a case where the user has selected a seal image with use of the mobile terminal 5) for operating a household appliance 4 with use of the mobile terminal 5, the agent server 1*e* determines an action content of the household appliance 4 depending on whether a house-sitting setting of the household appliance 4 is "ON" or "OFF". Then, the agent server 1*e* transmits, to the household appliance 4, an action execution instruction for causing the household appliance 4 to execute the determined action.

(Process of Transmitting Appliance Operating Instruction)

The following description will discuss a process of transmitting the appliance operating instruction, with reference to FIG. 17. FIG. 17 is a block diagram illustrating an example of main configurations of the agent server 1*e* and the mobile terminal 5. Note that main configurations of the mobile terminal 5 have already been described in Embodiment 1, and are therefore not described here. Moreover, main configurations of the agent server 1*e* will be described later.

As above described, the appliance operating instruction is an instruction on operating a household appliance 4 with use of the mobile terminal 5, and is generated by the instruction generating section 521 in accordance with an input signal from the operation obtaining section 51. Based on the input signal thus received, the instruction generating section 521 refers to a seal image database (not illustrated) which is stored in a storage section (not illustrated) of the mobile terminal 5. Then, the instruction generating section 521 identifies (i) an image ID of a seal image which has been selected by the user and (ii) an appliance ID of a household appliance 4 which is to execute an action that is instructed by the seal image. Note that the seal image database is a database for managing seal image data, image IDs, appliance IDs of household appliances 4 which are instruction targets so that those pieces of data are associated with each other.

Then, the instruction generating section 521 generates an appliance operating instruction which includes the identified image ID and appliance ID, and transmits the appliance operating instruction to the family message board server 2 together with seal image data of the seal image which has been selected by the user. The family message board server 2 transmits the appliance operating instruction thus received to the agent server 1*e*.

(Agent Server 1*e*)

The following description will discuss details of a configuration of the agent server 1*e* in accordance with Embodiment 6, with reference to FIG. 17.

As illustrated in FIG. 17, the agent server 1*e* includes (i) a control section 12*e* instead of the control section 12 and (ii) a storage section 13*e* instead of the storage section 13, as compared with the agent server 1 in accordance with Embodiment 1.

In Embodiment 6, the control section 12*e* includes a process executing section 22*e* instead of the process executing section 22, as compared with the control section 12 in accordance with Embodiment 1. The storage section 13*e* stores (i) an action management database 36 instead of the post generating data 31 and (ii) a setting management database 32*e* instead of the setting management database 32, as compared with the storage section 13 in accordance with Embodiment 1.

The setting management database 32*e* is similar to the setting management database 32 described in Embodiment 1, except that the setting management database 32*e* does not have a column of "trigger".

The action management database 36 manages action contents of household appliances 4 in accordance with house-sitting settings (i.e., action contents based on appliance operating instructions). Here, details of the action management database 36 are described with reference to FIG. 18. FIG. 18 is a view illustrating a specific example of a data structure of the action management database 36. Note, however, that the action management database 36 is not limited to the example shown in FIG. 18.

In a column of "image ID", image IDs for identifying seal images are stored. In a column of "house-sitting setting", flags indicating house-sitting settings, i.e., "ON" or "OFF" are stored. In a column of "action content", pieces of information (hereinafter, referred to as "action content information") indicating action contents to be executed by household appliances 4 are stored. That is, the action management database 36 manages, for each image ID, (i) an action content of a household appliance 4 in a case where a house-sitting setting is "ON" and (ii) an action content of the household appliance 4 in a case where the house-sitting setting is "OFF". According to the configuration, in a case where an image ID and a house-sitting setting of a household appliance 4 which is an instruction target are identified, the agent server 1e can identify, with reference to the action management database 36, an action content which the household appliance 4 is to be instructed to execute.

In the example shown in FIG. 18, an image ID "P0001" of a seal image for causing the air conditioner 4c to execute an automatic operation is stored. Here, in a case where the house-sitting setting of the air conditioner 4c is "ON", the agent server 1e instructs the air conditioner 4c to carry out a cooling operation at a setting temperature of 28 degrees. Meanwhile, in a case where the house-sitting setting of the air conditioner 4c is "OFF", the agent server 1e instructs the air conditioner 4c to carry out a cooling operation at a setting temperature of 26 degrees. As such, with reference to the action management database 36, the agent server 1e can transmit, to the household appliance 4, an action execution instruction in accordance with a house-sitting setting at a timing at which the agent server 1e has received an appliance operating instruction.

The process executing section 22e includes (i) a setting determination section 221e instead of the setting determination section 221 and (ii) an appliance action executing section 225 instead of the posting execution section 222, as compared with the process executing section 22 in accordance with. Embodiment 1.

Unlike the setting determination section 221 in accordance with Embodiment 1, in a case where the setting determination section 221e has received an appliance operating instruction transmitted from the mobile terminal 5, the setting determination section 221e identifies, from the setting management database 32e, an appliance ID which conforms to an appliance ID included in the appliance operating instruction. Then, the setting determination section 221e determines whether a house-sitting setting associated with the identified appliance ID is "ON" or "OFF", and outputs the determination result, the appliance ID, and an image ID to the appliance action executing section 225.

The appliance action executing section 225 determines, depending on whether the house-sitting setting is "ON" or "OFF", an action to be executed by the household appliance 4, and instructs the household appliance 4 to execute the action. Specifically, the appliance action executing section 225 receives the determination result, the appliance ID, and the image ID from the setting determination section 221e. Then, with reference to the action management database 36, the appliance action executing section 225 identifies an action content associated with the received image ID and determination result (i.e., information indicating whether the house-sitting setting is "ON" or "OFF"). Then, the appliance action executing section 225 transmits, via the home server 3, an action execution instruction on executing the identified action content to a household appliance 4 which is indicated by the received appliance ID.

(Flow of Processes Executed by the Agent Server 1e)

The following description will discuss a flow of processes executed by the agent server 1e, with reference to FIG. 19. FIG. 19 is a flowchart showing an example of a flow of processes executed by the agent server 1e. Note that steps S51 through S53 in FIG. 19 are similar to the respective steps S1 through S3 in FIG. 6, and therefore descriptions of the steps S51 through S53 are omitted here.

The setting determination section 221e is in a state of waiting for an appliance operating instruction (S54). In a case where the setting determination section 221e has received an appliance operating instruction (YES in S54), the setting determination section 221e identifies a house-sitting setting of a household appliance 4 which is a target of the appliance operating instruction (S55). Specifically, the setting determination section 221e receives an appliance operating instruction which has been transmitted from the mobile terminal 5. Then, the setting determination section 221e identifies, from the setting management database 32e, an appliance ID which conforms to an appliance ID included in the appliance operating instruction. Then, the setting determination section 221e determines whether a house-sitting setting associated with the identified appliance ID is "ON" or "OFF", and outputs the determination result, the appliance ID, and an image ID to the appliance action executing section 225.

Subsequently, the appliance action executing section 225 transmits, to the home server 3, an action execution instruction in accordance with the identified house-sitting setting (S56). Specifically, in a case where the appliance action executing section 225 has received the determination result, the appliance ID, and the image ID from the setting determination section 221e, the appliance action executing section 225 identifies, with reference to the action management database 36, an action content associated with the received image ID and determination result (i.e., information indicating whether the house-sitting setting is "ON" or "OFF"). Then, the appliance action executing section 225 transmits, via the home server 3, an action execution instruction on executing the identified action content to a household appliance 4 which is indicated by the received appliance ID.

Note that the configurations described in Embodiment 6 are applicable to Embodiments 1 through 5. The seal image database described in Embodiment 6 is not limited to the above described example. For example, it is possible that the seal image database stores pieces of seal image data and image IDs so that the pieces of seal image data and the image IDs are associated with each other, and the agent server 1e stores image IDs and appliance IDs of household appliances 4 which are instruction targets so that the image IDs and the appliance IDs are associated with each other. That is, it is possible that the instruction generating section 521 transmits an appliance operating instruction which includes only an image ID to the agent server 1e, and the agent server 1e (setting determination section 221e) identifies an appliance ID of a household appliance 4 which is an instruction target based on the image ID thus received.

In Embodiment 6, the example is described in which the agent server 1e receives an appliance operating instruction from the mobile terminal 5 and transmits the action execution instruction to the household appliance 4. With regard to this, the agent server 1e can transmit an action execution instruction to the household appliance 4 when a house-sitting setting is changed in accordance with a house-sitting setting instruction (or a house-sitting setting instruction). For example, in a case where a house-sitting setting of the washing machine 4d is set to ON and a remaining time of washing has become 30 minutes, the agent server 1e instructs the washing machine 4d to transmit a notice of the remaining time of washing to the agent server 1e. Meanwhile, in a case where the house-sitting setting of the washing machine 4d is set to OFF and the remaining time of washing has become 5 minutes, the agent server 1e instructs the washing machine 4d to transmit a notice of the remaining time of washing to the agent server 1e. Then, in a case where a configuration is employed in which the agent server 1e transmits posting data of "The washing will finish soon." to the family message board server 2 when the agent server 1e has received the notice of the remaining time, it is possible to achieve posting of a message which corresponds to a state of the user (i.e., whether or not the user is out).

MODIFICATION EXAMPLE

In Embodiments 1 through 6 described above, the modes of the household appliances 4 are two, i.e., "ON" and "OFF" of house-sitting settings. Note, however, that the modes of the household appliances 4 can be three or more. For example, the agent server 1 can manage three modes, i.e., a "two-at-home mode", an "only-user-at-home mode", and a "two-are-out mode", in accordance with whether each of a bedridden user and a helper is at home or being out. Here, the following description will discuss a configuration example in which, as a process executed by the agent server, a content to be posted on the family message board when the door of the refrigerator 4b is opened is changed in accordance with the modes. For example, in the "two-at-home mode", the agent server 1 transmits posting data of "Hey helper, today is a bargain day at the supermarket." to the family message board server 2. In the "only-user-at-home mode", the agent server transmits posting data of "Somebody has opened the door." In the "two-are-out mode", the agent server transmits posting data of "Two have returned home".

The modes of the household appliances 4 are not limited to "ON" and "OFF" of the house-sitting setting, that is, to (i) a mode which defines an action of the agent server 1 in a state in which the user is out and (ii) a mode which defines an action of the agent server 1 in a state in which the user is at home. For example, the modes can be a mode which defines an action of the agent server 1 in a state in which survival of the user can be confirmed, and a mode which defines an action of the agent server 1 in a state in which survival of the user cannot be confirmed. From this, for example, it is possible to apply the family message board system 10 to a system for watching over an elderly person living alone (i.e., for confirming whether or not any abnormality occurs on a subject to be watched over).

In Embodiments 1 through 6 above, the configuration is described in which the user operates the mobile terminal 5 so as to transmit a house-sitting setting instruction (or house-sitting setting cancelling instruction). Note, however, that Embodiments 1 through 6 are not limited to this configuration. For example, an instruction can be transmitted from the household appliance 4 in a case where the user has operated a button provided in the household appliance 4 or a remote controller for the household appliance 4, or an instruction can be transmitted from a home security system or the like. Alternatively, an instruction can be automatically transmitted in accordance with location information of the mobile terminal 5 of the user. Alternatively, it is possible to employ a configuration in which a time for going out is set in advance in the mobile terminal 5, the household appliance 4, a home security system, or the like and an instruction is automatically transmitted at the time which has been set in advance. Alternatively, the time for going out can be set in the agent server 1. That is, the agent server 1 can change a house-sitting setting when the time comes which has been set as the time for going out, without obtaining external information.

Embodiment 7

In each of the above embodiments, the example has been described in which one of the agent server 1 and the agent servers 1a through 1e is used. With regard to this, functions of the agent server 1 and the agent servers 1a through 1e can be achieved in separate servers. In a case where a plurality of servers are employed, the plurality of servers can be managed by the same operator or by different operators.

Embodiment 8

Each blocks in the agent server 1, the agent servers 1a through 1e, and the mobile terminal 5 can be realized by a logic circuit (hardware) provided in an integrated circuit (IC chip) or the like or can be alternatively realized by software as executed by a central processing unit (CPU). In the latter case, it is possible to configure each of the agent server 1, the agent servers 1a through 1e, and the mobile terminal 5 with use of a computer as illustrated in FIG. 20.

Figure 20:
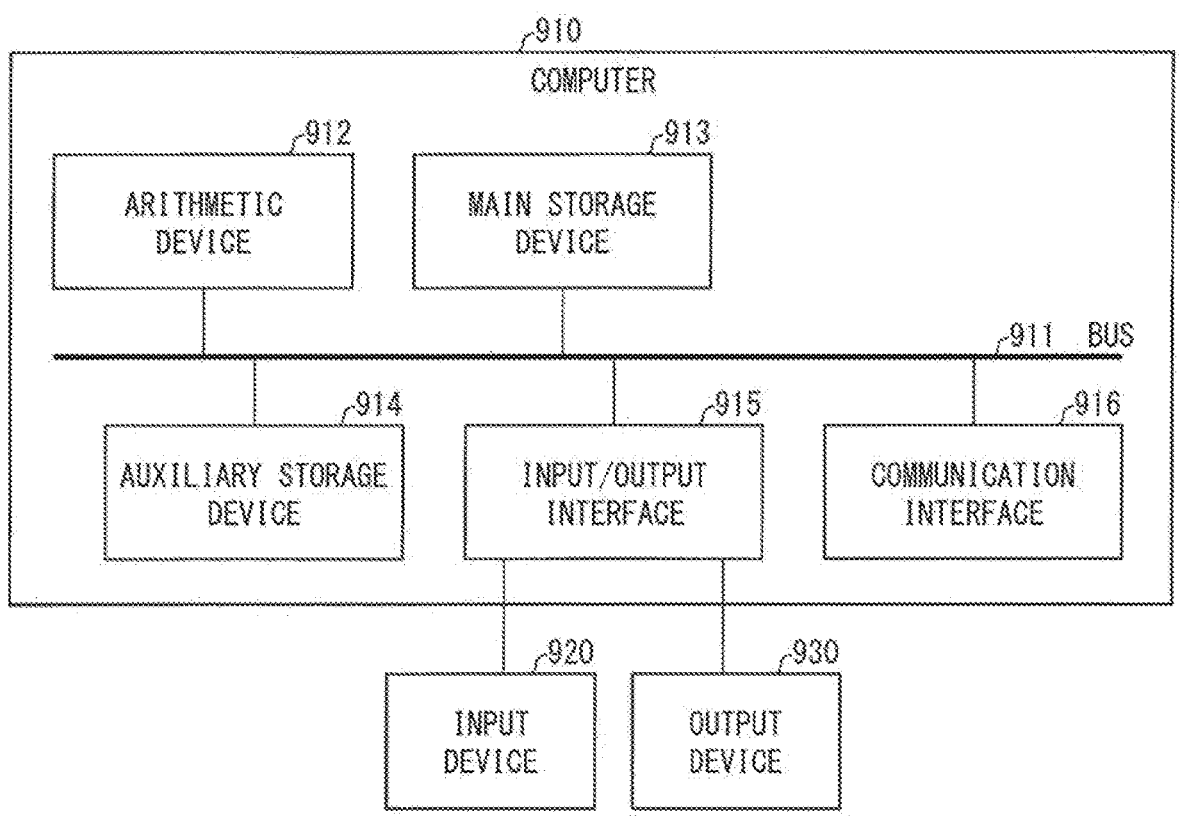

FIG. 20 is a block diagram exemplifying a configuration of a computer 910 which can be used as any of the agent server 1, the agent servers 1a through 1e, and the mobile terminal 5. The computer 910 includes an arithmetic device 912, a main storage device 913, an auxiliary storage device 914, an input/output interface 915, and a communication interface 916 which are connected to each other via a bus 911. The arithmetic device 912, the main storage device 913, and the auxiliary storage device 914 can be, for example, a CPU, a random access memory (RAM), and a hard disk drive, respectively. The input/output interface 915 is connected with (i) an input device 920 with which user inputs various information to the computer 910 and (ii) an output device 930 via which the computer 910 outputs various information to the user. The input device 920 and the output device 930 can be incorporated into the computer 910 or can be devices which are (externally) connected to the computer 910. For example, the input device 920 can be a keyboard, a mouse, a touch sensor, or the like, and the output device 930 can be a display, a printer, a speaker, or the like. Alternatively, it is possible to employ a device having functions of both the input device 920 and the output device 930, such as a touch panel in which a touch sensor and a display are integrated. The communication interface 916 is an interface via which the computer 910 communicates with an external device.

The auxiliary storage device 914 stores various programs for causing the computer 910 to function as any of the agent server 1, the agent servers 1a through 1e, and the mobile terminal 5. The arithmetic device 912 loads, on the main storage device 913, the various programs stored in the auxiliary storage device 914 and executes a command included in each of the various programs so that the computer 910 functions as each section of the agent server 1, the agent servers 1a through 1e, and the mobile terminal 5. Note that a storage medium which is included in the auxiliary storage device 914 for recording information such as the various programs only needs to be a computer-readable "non-transitory tangible medium" and can be, for example, a tape, a disk, a card, a semiconductor memory, a programmable logic circuit, or the like.

The various programs can be obtained from outside of the computer 910. In this case, the various programs can be obtained via any transmission medium (such as a communication network or a broadcast wave). The present invention can also be achieved in the form of a computer data signal in which the various programs are embodied via electronic transmission and which is embedded in a carrier wave.

[Main Points]

The control device (agent server 1) in accordance with an aspect 1 of the present invention is a control device for controlling an action of a control target device (household appliance 4) in a mode which corresponds to a state of a user among a plurality of modes, and includes: a mode identifying section (setting management section 21) for identifying the mode; and a process executing section (22) for executing a process in accordance with the mode which has been identified by the mode identifying section.

According to the configuration, a process corresponding to the identified mode is executed, and it is therefore possible to control the control target device in accordance with a state of the user.

Note that examples of the plurality of modes corresponding to states of the user encompass "a mode which defines an action of the control device in a state in which the user is out, and a mode which defines an action of the control device in a state in which the user is at home", "a mode which defines an action of the control device in a state in which survival of the user who is a subject to be watched over can be confirmed, and a mode which defines an action of the control device in a state in which survival of the user who is a subject to be watched over cannot be confirmed", and the like.

In the control device in accordance with an aspect 2 of the present invention, it is possible in the aspect 1 that the plurality of modes include a first mode and a second mode, the first mode defining an action of the control device in a state in which the user cannot operate the control target device without using the control device, and the second mode defining an action of the control device in a state in which the user can operate the control target device without using the control device.

According to the configuration, the plurality of modes include a first mode and a second mode, the first mode defining an action of the control device in a state in which the user cannot operate the control target device without using the control device, and the second mode defining an action of the control device in a state in which the user can operate the control target device without using the control device. That is, the first mode defines an action of the control device in a state in which the user is out, and the second mode defines an action of the control device in a state in which the user is at home. Here, the control device executes a process in accordance with the mode, and it is therefore possible to control the control target device depending on whether or not the user is out.

In the control device in accordance with an aspect 3 of the present invention, it is possible in the aspect 2 that, in a case where the mode is the first mode, the process executing section transmits a message to a service providing server which provides a communication service of displaying messages on a time-series basis, and, in a case where the mode is the second mode, the process executing section does not transmit a message to the service providing server.

According to the configuration, in a case where the mode is the first mode, a message is transmitted to the service providing server and, in a case where the mode is the second mode, no message is transmitted. From this, it is possible to present, to the user of the communication service, a message which corresponds to the state in which the user is out. Therefore, it is possible to achieve artificial communications between the user and the control target device in accordance with a state of the user.

Note that an example of the message encompasses a message which indicates that somebody has operated the control target device without using the control device (i.e., somebody pressed a physical button of the control target device or operated a remote controller). By transmitting the message, it is possible to present, to the user of the communication service, that somebody has operated the control target device, i.e., somebody has returned home in a state in which the user is out.

In the control device in accordance with an aspect 4 of the present invention, it is possible in the aspect 2 that, in a case where the mode is the first mode, the process executing section transmits a first message to a service providing server which provides a communication service of displaying messages on a time-series basis, and, in a case where the mode is the second mode, the process executing section transmits a second message to the service providing server, the second message being different from the first message.

According to the configuration, in a case where the mode is the first mode, the first message is transmitted to the service providing server and, in a case where the mode is the second mode, the second message which is different from the first message is transmitted. From this, it is possible to present different messages in the communication service depending on whether the user is out or the user is at home. Therefore, it is possible to achieve artificial communications between the user and the control target device in accordance with a state of the user.

In the control device in accordance with an aspect 5 of the present invention, it is possible in any of the aspects 2 through 4 that the process executing section switches, in accordance with the mode identified by the mode identifying section, whether or not to cause the control target device to output audio.

According to the configuration, depending on whether the mode is the first mode or the second mode, the process executing section switches whether or not to cause the control target device to output audio. From this, it is possible to achieve audio output by the control target device in accordance with a state of the user.

For example, in a case where the mode is the first mode, audio is not outputted and, in a case where the mode is the second mode, audio is outputted. With the configuration, it is possible to prevent a situation in which the control target device outputs audio even though the user is not at home (i.e., nobody is at home). Meanwhile, in a case where the control target device is set as follows: that is, audio of "Welcome back." is outputted in the first mode, no audio is outputted in the second mode, and the audio is outputted when the user has returned home, it is possible to achieve appropriate artificial communications between the user and the control target device depending on the situation.

In the control device in accordance with an aspect 6 of the present invention, it is possible in any of the aspects 2 through 4 that, in a case where the control target device has obtained a predetermined user operation, the control target device outputs audio based on audio data; in a case where the mode is the first mode, the process executing section causes the control target device to output first audio, and, in a case where the mode is the second mode, the process executing section causes the control target device to output second audio which is different from the first audio.

According to the configuration, in a case where the mode is the first mode, the process executing section causes the control target device to output first audio in accordance with the predetermined user operation, and, in a case where the mode is the second mode, the process executing section causes the control target device to output second audio which is different from the first audio in accordance with the predetermined user operation. From this, depending on whether the user has returned home from outside and has carried out a user operation or the user has carried out a user operation in a state of being at home, it is possible to cause the control target device to output different contents of audio. Therefore, it is possible to achieve artificial communications between the user and the control target device in accordance with a state of the user.

In the control device in accordance with an aspect 7 of the present invention, it is possible in any of the aspects 2 through 6 that, in a case where the mode is the first mode and the process executing section has determined that the control device has entered a state in which the user can operate the control target device without using the control device, the process executing section changes the mode from the first mode to the second mode.

According to the configuration, in a case where the mode is the first mode and the process executing section has identified that the user has returned home from outside, the process executing section changes the first mode into the second mode. From this, it is possible to automatically change, when the user has returned home, the mode to a mode which defines an action of the control device in a state in which the user is at home.

In the control device in accordance with an aspect 8 of the present invention, it is possible in any of the aspects 1 through 7 that, among a plurality of images which are associated with respective execution instructions on actions to be executed by the control target device, the process executing section causes a terminal device (mobile terminal to display images indicative of execution instructions on actions which the control device in a current mode can instruct the control target device to execute, the images being displayed so as to be selected by the user, and the terminal device obtaining an operation for selecting an image from the plurality of images and transmitting, to the control device, an execution instruction on an action which corresponds to the image thus selected.

According to the configuration, the process executing section causes the terminal device to display images indicative of execution instructions on actions, which the control device in a current mode can instruct the control target device to execute, such that the images are displayed so as to be selected by the user. This makes it possible to prevent an image, which indicates an execution instruction on an action which the control target device cannot execute in the current mode, from being selected by the user.

In the control device in accordance with an aspect 9 of the present invention, it is possible in any of the aspects 1 through 8 that the process executing section determines an action to be executed by the control target device in accordance with a current mode of the control device, and instructs the control target device to execute the action thus determined.

According to the configuration, the process executing section determines an action to be executed by the control target device in accordance with a current mode of the control device, and instructs the control target device to execute the action thus determined. From this, it is possible to cause the control target device to execute an action in accordance with a state of the user.

For example, in a case where the control device has received an instruction on causing an air conditioner to execute an automatic operation of cooling and the control device is in the mode defining an action of the control device in a state in which the user is out, a setting temperature is set to be higher as compared with the mode defining an action of the control device in a state in which the user is at home. This makes it possible to reduce electric power consumed by the air conditioner.

In the control device in accordance with an aspect 10 of the present invention, it is possible in any of the aspects 1 through 9 that the control device controls a plurality of target devices, each of which is the above described control target device.

According to the configuration, the control device controls the plurality of control target devices. From this, the control device can comprehensively control the plurality of control target devices.

The control method in accordance with an aspect 11 of the present invention is a method for controlling a control device which controls an action of a control target device in a mode which corresponds to a state of a user among a plurality of modes, and the control method includes the steps of: (a) identifying the mode (step S3); and (b) executing a process in accordance with the mode which has been identified in the step (step S7).

This control method brings about an effect similar to that of the control device in accordance with the aspect 1.

The control system (family message board system 10) in accordance with an aspect 12 of the present invention includes: a control target device; and a control device which controls an action of the control target device in a mode which corresponds to a state of a user among a plurality of modes, the control device specifying the mode and executing a process in accordance with the mode thus identified.

This control system brings about an effect similar to that of the control device in accordance with the aspect 1.

The terminal device (mobile terminal accordance with an aspect 13 of the present invention is a terminal device which (i) obtains an operation of selecting an image among a plurality of images which are associated with respective execution instructions on actions to be executed by a control target device and (ii) transmits, to a control device, an execution instruction on an action corresponding to the image which has been selected, the control device obtaining the execution instruction associated with the image which has been selected from among the plurality of images and controlling an action of the control target device in a mode corresponding to a state of a user among a plurality of modes, in which: the terminal device displays images indicative of execution instructions on actions which the control device in a current mode can instruct the control target device to execute, the images being displayed so as to be selected by the user.

According to the configuration, the terminal device displays images indicative of execution instructions on action's, which the control device in a current mode can instruct the control target device to execute, such that the images can be selected by the user. This makes it possible to prevent an image, which indicates an execution instruction on an action which the control target device cannot execute in the current mode, from being selected by the user.

The control target device (household appliance 4) in accordance with an aspect 14 of the present invention is a control target device whose action is controlled by a control device for executing a process in a mode which corresponds to a state of a user among a plurality of modes, in which: the control target device executes an action which (i) is indicated by an instruction from the control device and (ii) corresponds to a current mode of the control device.

According to the configuration, the control target device executes an action which (i) is indicated by an instruction from the control device and (ii) corresponds to a current mode of the control device. Therefore, it is possible to execute an action in accordance with a state of the user.

Each of the control device, the terminal device, and the control target device in accordance with each of the aspects of the present invention can be realized by a computer. In such a case, the present invention encompasses (i) a control program of each of the control device, the terminal device, and the control target device which control program causes the computer to serve as the sections (software elements) of each of the control device, the terminal device, and the control target device for realizing each of the control device, the terminal device, and the control target device and (ii) a computer-readable storage medium storing the control program.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

INDUSTRIAL APPLICABILITY

The present invention is applicable to a control device for controlling an action of a control target device in a mode which corresponds to a state of a user among a plurality of modes, and the like.

REFERENCE SIGNS LIST

1: Agent server (control device)
2: Family message board server (service providing server)
4: Household appliance (control target device)
5: Mobile terminal (terminal device)
10: Family message board system (control system)
21: Setting management section (mode identifying section)
22: Process executing section
S3: Mode identifying step
S7: Process executing step

The invention claimed is:

1. A control device for controlling an action of a control target device in a mode which corresponds to a state of a user among a plurality of modes,
    said control device writing, via a service providing server which provides a communication service of displaying messages on a time-series basis, a message in the communication service,
    said control device comprising:
    a mode identifying section for identifying the mode; and
    a process executing section for executing a process in accordance with the mode which has been identified by the mode identifying section,
    the plurality of modes including a first mode and a second mode, the first mode defining an action of said control device in a state in which the user cannot operate the control target device without using said control device, and the second mode defining an action of said control device in a state in which the user can operate the control target device without using said control device,
    in a case where the mode is the first mode, the process executing section transmitting a message to the service providing server, and, in a case where the mode is the second mode, the process executing section not transmitting a message to the service providing server,
    the control device changing the mode from the first mode to the second mode based on change in state of the control target device.

2. The control device as set forth in claim 1, wherein:
    the process executing section switches, in accordance with the mode identified by the mode identifying section, whether or not to cause the control target device to output audio.

3. The control device as set forth in claim 1, wherein:
    in a case where the control target device has obtained a predetermined user operation, the control target device outputs audio based on audio data;
    in a case where the mode is the first mode, the process executing section causes the control target device to output first audio, and, in a case where the mode is the second mode, the process executing section causes the control target device to output second audio which is different from the first audio.

4. The control device as set forth in claim 1, wherein:
    in a case where the mode is the first mode and the process executing section has determined that said control device has entered a state in which the user can operate the control target device without using said control device, the process executing section changes the mode from the first mode to the second mode.

5. The control device as set forth in claim 1, wherein:
    among a plurality of images which are associated with respective execution instructions on actions to be executed by the control target device, the process executing section causes a terminal device to display images indicative of execution instructions on actions which said control device in a current mode can instruct the control target device to execute, the images being displayed so as to be selected by the user, and the terminal device obtaining an operation for selecting an image from the plurality of images and transmitting, to said control device, an execution instruction on an action which corresponds to the image thus selected.

6. The control device as set forth in claim 1, wherein:
    the process executing section determines an action to be executed by the control target device in accordance with a current mode of said control device, and instructs the control target device to execute the action thus determined.

7. The control device as set forth in claim 1, wherein:
    said control device controls a plurality of target devices, each of which is the control target device.

8. A non-transitory computer readable storage medium which stores a control program for causing a computer to function as a control device recited in claim 1, said control program causing the computer to function as the mode identifying section and the process executing section.

9. A method for controlling a control device which controls an action of a control target device in a mode which corresponds to a state of a user among a plurality of modes,
    said control device writing, via a service providing server which provides a communication service of displaying messages on a time-series basis, a message in the communication service,
    said method comprising the steps of:
    (a) identifying the mode; and
    (b) executing a process in accordance with the mode which has been identified in the step (a),
    the plurality of modes including a first mode and a second mode, the first mode defining an action of said control device in a state in which the user cannot operate the control target device without using said control device, and the second mode defining an action of said control device in a state in which the user can operate the control target device without using said control device, in a case where the mode is the first mode, the process executing section transmitting a message to the service providing server, and, in a case where the mode is the second mode, the process executing section not transmitting a message to the service providing server, the control device changing the mode from the first mode to the second mode based on change in state of the control target device.

10. A control system comprising: a control target device and a control device for controlling an action of the control target device in a mode which corresponds to a state of a user among a plurality of modes, the control device specifying the mode and executing a process in accordance with the mode thus identified, the control device writing, via a service providing server which provides a communication service of displaying messages on a time-series basis, a message in the communication service, the plurality of modes including a first mode and a second mode, the first mode defining an action of said control device in a state in which the user cannot operate the control target device without using said control device, and the second mode defining an action of said control device in a state in which the user can operate the control target device without using said control device, in a case where the mode is the first mode, the process executing section transmitting a message to the service providing server, and, in a case where the mode is the second mode, the process executing section not transmitting a message to the service providing server, the control device changing the mode from the first mode to the second mode based on change in state of the control target device.

11. A control device for controlling an action of a control target device in a mode which corresponds to a state of a user among a plurality of modes, said control device writing, via a service providing server which provides a communication service of displaying messages on a time-series basis, a message in the communication service, said control device comprising:

a mode identifying section for identifying the mode; and a process executing section for executing a process in accordance with the mode which has been identified by the mode identifying section, the plurality of modes including a first mode and a second mode, the first mode defining an action of said control device in a state in which the user cannot operate the control target device without using said control device, and the second mode defining an action of said control device in a state in which the user can operate the control target device without using said control device, in a case where the mode is the first mode, the process executing section transmitting a first message to the service providing server, and, in a case where the mode is the second mode, the process executing section transmitting a second message to the service providing server, the second message being different from the first message, the control device changing the mode from the first mode to the second mode based on change in state of the control target device.

12. A control device for controlling an action of a control target device in a mode which corresponds to a state of a user among a plurality of modes, said control device writing, via a service providing server which provides a communication service of displaying messages on a time-series basis, a message in the communication service, said control device comprising:

a mode identifying section for identifying the mode; and a process executing section for executing a process in accordance with the mode which has been identified by the mode identifying section, the plurality of modes including a first mode and a second mode, the first mode defining an action of said control device in a state in which the user cannot operate the control target device without using said control device, and the second mode defining an action of said control device in a state in which the user can operate the control target device without using said control device, in a case where the control target device has obtained a predetermined user operation, the control target device outputting audio based on audio data, in a case where the mode is the first mode, the process executing section causing the control target device to output first audio, and, in a case where the mode is the second mode, the process executing section causing the control target device to output second audio which is different from the first audio, the control device changing the mode from the first mode to the second mode based on change in state of the control target device.

13. A method for controlling a control device which controls an action of a control target device in a mode which corresponds to a state of a user among a plurality of modes, said control device writing, via a service providing server which provides a communication service of displaying messages on a time-series basis, a message in the communication service, said method comprising the steps of:

(a) identifying the mode; and (b) executing a process in accordance with the mode which has been identified in the step (a), the plurality of modes including a first mode and a second mode, the first mode defining an action of said control device in a state in which the user cannot operate the control target device without using said control device, and the second mode defining an action of said control device in a state in which the user can operate the control target device without using said control device, in a case where the mode is the first mode, the process executing section transmitting a first message to the service providing server, and in a case where the mode is the second mode, the process executing section transmitting a second message to the service providing server, the second message being different from the first message, the control device changing the mode from the first mode to the second mode based on change in state of the control target device.

14. A method for controlling a control device which controls an action of a control target device in a mode which corresponds to a state of a user among a plurality of modes, said control device writing, via a service providing server which provides a communication service of displaying messages on a time-series basis, a message in the communication service, said method comprising the steps of:

(a) identifying the mode; and (b) executing a process in accordance with the mode which has been identified in the step (a), the plurality of modes including a first mode and a second mode, the first mode defining an action of said control device in a state in which the user cannot operate the control target device without using said control device, and the second mode defining an action of said control device in a state in which the user can operate the control target device without using said control device, in a case where the control target device has obtained a predetermined user operation, the control target device outputting audio based on audio data, in a case where the mode is the first mode, the process executing section causing the control target device to output first audio, and, in a case where the mode is the second mode, the process executing section causing the control target device to output second audio which is different from the first audio, the control device changing the mode from the first mode to the second mode based on change in state of the control target device.

15. A control system comprising: a control target device and a control device for controlling an action of the control target device in a mode which corresponds to a state of a user among a plurality of modes, the control device specifying the mode and executing a process in accordance with the mode thus identified, the control device writing, via a service providing server which provides a communication service of displaying messages on a time-series basis, a message in the communication service, the plurality of modes including a first mode and a second mode, the first mode defining an action of said control device in a state in which the user cannot operate the control target device without using said control device, and the second mode defining an action of said control device in a state in which the user can operate the control target device without using said control device, in a case where the mode is the first mode, the process executing section transmitting a first message to the service providing server, and, in a case where the mode is the second mode, the process executing section transmitting a second message to the service providing server, the second message being different from the first message, the control device changing the mode from the first mode to the second mode based on change in state of the control target device.

16. A control system comprising: a control target device and a control device for controlling an action of the control target device in a mode which corresponds to a state of a user among a plurality of modes, the control device specifying the mode and executing a process in accordance with the mode thus identified, the control device writing, via a service providing server which provides a communication service of displaying messages on a time-series basis, a message in the communication service, the plurality of modes including a first mode and a second mode, the first mode defining an action of said control device in a state in which the user cannot operate the control target device without using said control device, and the second mode defining an action of said control device in a state in which the user can operate the control target device without using said control device, in a case where the control target device has obtained a predetermined user operation, the control target device outputting audio based on audio data, in a case where the mode is the first mode, the process executing section causing the control target device to output first audio, and, in a case where the mode is the second mode, the process executing section causing the control target device to output second audio which is different from the first audio, the control device changing the mode from the first mode to the second mode based on change in state of the control target device.

\* \* \* \* \*